United States Patent
Podilchuk et al.

(10) Patent No.: US 11,551,361 B2
(45) Date of Patent: Jan. 10, 2023

(54) METHOD AND SYSTEM OF COMPUTER-AIDED DETECTION USING MULTIPLE IMAGES FROM DIFFERENT VIEWS OF A REGION OF INTEREST TO IMPROVE DETECTION ACCURACY

(71) Applicant: Koios Medical, Inc., New York City, NY (US)

(72) Inventors: Christine Podilchuk, Warren, NJ (US); Ajit Jairaj, Edison, NJ (US); Lev Barinov, North Brunswick, NJ (US); William Hulbert, Somerset, NJ (US); Richard Mammone, Warren, NJ (US)

(73) Assignee: Koios Medical, Inc., New York, NY (US)

( * ) Notice: Subject to any disclaimer, the term of this patent is extended or adjusted under 35 U.S.C. 154(b) by 196 days.

(21) Appl. No.: 16/504,940

(22) Filed: Jul. 8, 2019

(65) Prior Publication Data

US 2020/0175684 A1 Jun. 4, 2020

Related U.S. Application Data

(63) Continuation of application No. 15/338,707, filed on Oct. 31, 2016, now Pat. No. 10,346,982.

(60) Provisional application No. 62/377,945, filed on Aug. 22, 2016.

(51) Int. Cl.
G06T 7/00 (2017.01)
G06T 7/223 (2017.01)

(52) U.S. Cl.
CPC ............ *G06T 7/0016* (2013.01); *G06T 7/223* (2017.01); *G06T 2207/10121* (2013.01); *G06T 2207/10132* (2013.01); *G06T 2207/20081* (2013.01); *G06T 2207/30096* (2013.01)

(58) Field of Classification Search
CPC .................. G06T 7/0016; G06T 7/223; G06T 2207/10121; G06T 2207/10132; G06T 2207/20081; G06T 2207/30096
See application file for complete search history.

(56) References Cited

U.S. PATENT DOCUMENTS

| | | |
|---|---|---|
| 5,260,871 A | 11/1993 | Goldberg |
| 7,418,119 B2 | 8/2008 | Leichter et al. |
| 7,570,051 B2 | 8/2009 | Haider |

(Continued)

FOREIGN PATENT DOCUMENTS

| | | |
|---|---|---|
| CN | 104143101 A | 11/2014 |
| CN | 105913086 A | 8/2016 |

(Continued)

OTHER PUBLICATIONS

Ulrich Neumann et al., "Integration of region tracking and optical flow for image motion estimation" 1998 IEEE (Year: 1998).*

(Continued)

*Primary Examiner* — Mekonen T Bekele

(57) ABSTRACT

A system and method of computer-aided detection (CAD or CADe) of medical images that utilizes persistence between images of a sequence to identify regions of interest detected with low interference from artifacts to reduce false positives and improve probability of detection of true lesions, thereby providing improved performance over static CADe methods for automatic ROI lesion detection.

24 Claims, 15 Drawing Sheets

(56) References Cited

U.S. PATENT DOCUMENTS

| | | | |
|---|---|---|---|
| 9,536,054 | B1 | 1/2017 | Podilchuk et al. |
| 9,934,567 | B2 | 4/2018 | Podilchuk et al. |
| 9,959,617 | B2 | 5/2018 | Chang et al. |
| 10,339,650 | B2 | 7/2019 | Podilchuk et al. |
| 10,346,982 | B2 | 7/2019 | Podilchuk et al. |
| 10,380,718 | B2* | 8/2019 | Moon .............. G06T 3/20 |
| 11,096,674 | B2 | 8/2021 | Podilchuk et al. |
| 11,182,894 | B2 | 11/2021 | Podilchuk et al. |
| 2004/0184644 | A1 | 9/2004 | Leichter et al. |
| 2004/0254816 | A1 | 12/2004 | Myers |
| 2005/0010445 | A1 | 1/2005 | Krishnan et al. |
| 2005/0049497 | A1 | 3/2005 | Krishnan et al. |
| 2005/0059876 | A1 | 3/2005 | Krishnan et al. |
| 2005/0111718 | A1 | 5/2005 | MacMahon et al. |
| 2005/0244041 | A1 | 11/2005 | Tecotzky et al. |
| 2006/0122467 | A1 | 6/2006 | Harrington et al. |
| 2006/0210133 | A1 | 9/2006 | Krishnan et al. |
| 2007/0076957 | A1 | 4/2007 | Wang et al. |
| 2007/0133852 | A1 | 6/2007 | Collins et al. |
| 2007/0167727 | A1 | 7/2007 | Menezes et al. |
| 2009/0009531 | A1* | 1/2009 | Sudo .............. H04N 5/232945 345/629 |
| 2009/0034809 | A1 | 2/2009 | Oakley |
| 2009/0034810 | A1* | 2/2009 | Oakley .............. G06K 9/72 382/128 |
| 2009/0093711 | A1* | 4/2009 | Hermosillo Valadez .............. A61B 5/7264 600/420 |
| 2010/0121178 | A1 | 5/2010 | Krishnan et al. |
| 2010/0200660 | A1 | 8/2010 | Moed et al. |
| 2011/0164064 | A1 | 7/2011 | Tanaka et al. |
| 2011/0200227 | A1* | 8/2011 | Bogoni .............. G16H 30/20 382/103 |
| 2012/0088981 | A1 | 4/2012 | Liu et al. |
| 2012/0257804 | A1 | 10/2012 | Zhang et al. |
| 2013/0215388 | A1* | 8/2013 | Imamura .............. G06T 7/254 351/206 |
| 2014/0010430 | A1 | 1/2014 | Chandelier et al. |
| 2014/0066767 | A1 | 3/2014 | Mammone et al. |
| 2014/0105474 | A1* | 4/2014 | Lee .............. G06T 7/33 382/128 |
| 2014/0122515 | A1 | 5/2014 | Lee et al. |
| 2015/0160821 | A1* | 6/2015 | Cho .............. G06F 3/0482 715/769 |
| 2015/0230773 | A1 | 8/2015 | Cho et al. |
| 2016/0048972 | A1* | 2/2016 | Kam .............. G06T 7/174 382/128 |
| 2016/0063700 | A1* | 3/2016 | Itai .............. A61B 5/055 382/130 |
| 2016/0109955 | A1 | 4/2016 | Park et al. |
| 2016/0125265 | A1 | 5/2016 | Xie et al. |
| 2016/0133028 | A1 | 5/2016 | Park |
| 2016/0171682 | A1 | 6/2016 | Abedini et al. |
| 2017/0200266 | A1 | 7/2017 | Podilchuk et al. |
| 2017/0200268 | A1 | 7/2017 | Podilchuk et al. |
| 2017/0258451 | A1 | 9/2017 | Sakanashi et al. |
| 2018/0053300 | A1 | 2/2018 | Podilchuk et al. |
| 2018/0078313 | A1 | 3/2018 | Comaniciu et al. |
| 2019/0223845 | A1 | 7/2019 | Podilchuk et al. |
| 2020/0184635 | A1 | 6/2020 | Podilchuk et al. |

FOREIGN PATENT DOCUMENTS

| | | |
|---|---|---|
| JP | H07271872 A | 10/1995 |
| JP | 2006014967 A | 1/2006 |
| JP | 2009078082 A | 4/2009 |
| JP | 2013039230 A | 2/2013 |
| JP | 2013215524 A | 10/2013 |
| JP | 2015116319 A | 6/2015 |
| JP | 2015154918 A | 8/2015 |
| WO | WO 2007/138533 | 12/2007 |
| WO | WO-2016088758 A1 | 6/2016 |

OTHER PUBLICATIONS

Office Action for United Kingdom Application No. GB1703624.5, dated Mar. 12, 2021, 2 pages.

Extended European Search Report for European Application No. 17840359.8, dated Mar. 10, 2020, 13 pages.

Office Action for U.S. Appl. No. 16/324,835, dated Sep. 16, 2020, 26 pages.

Chao, S. et al., "Multi-label relevant vector machine based simultaneous fault diagnosis," 2013 25th Chinese Control and Decision Conference (CCDC), Guiyang, 2013, pp. 4792-4796, (with English Abstract), doi: 10.1109/CCDC.2013.6561801.

Majcenic, Z. et al., "CT image labeling using simulated annealing algorithm," Conference Proceedings of EUSIPCO, Rhodes, Greece, 1998, 4 pages.

Mazurowski, M. et al., "Individualized computer-aided education in mammography based on user modeling: Concept and preliminary experiments," Medical Physics, vol. 37, No. 3, Mar. 2010, pp. 1152-1160.

Search Report for United Kingdom Application No. GB1703624.5, dated Aug. 21, 2017, 4 pages.

Office Action for U.S. Appl. No. 15/200,719, dated Jan. 11, 2018, 23 pages.

Office Action for U.S. Appl. No. 15/200,719, dated Sep. 7, 2018, 26 pages.

International Search Report and Written Opinion for International Application No. PCT/US2017/046565, dated Sep. 12, 2017, 9 pages.

Office Action for U.S. Appl. No. 15/451,086, dated Sep. 11, 2017, 10 pages.

International Search Report and Written Opinion for International Application No. PCT/US2017/047995, dated Nov. 7, 2017, 16 pages.

Baker, J. A. et al., "Breast cancer: prediction with artificial neural network based on BI-RADS standardized lexicon," Radiology Society of North America, Sep. 1995, vol. 196, Issue 3, http://pubs.rsna.org/doi/abs/10.1148/radiology.196.3./644649.

Barinov, L. et al., "Decision Quality Support in Diagnostic Breast Ultrasound through Artificial Intelligence," IEEE Signal Processing in Medicine and Biology Symposium (SPMB), SPMB-L3.03, Dec. 3, 2016.

Berg, W. A. et al., "Breast-Imaging Reporting and Data System: Inter- and Intraobserver Variability in Feature Analysis and Final Assessment," AJR 2000;174:1769-1777. Retrieved from the Internet: <URL: http://www.ajronline.org>, by Rutgers University on Apr. 8, 2016.

Croskerry, P., "The Importance of Cognitive Errors in Diagnosis and Strategies to Minimize Them," Academic Medicine, Aug. 2003, 78(8):775-780.

Huang, Z. et al., "Beyond cross-entropy: Towards better frame-level objective functions for deep neural network raining in automatic speech recognition," ISCA, Sep. 2014, 1214-1218, http://research.microsofl.com/pubs/230081/IS140944.pdf.

Isaac, L. et al., "Computerized classification can reduce unnecessary biopsies in BI-RADS category 4A lesions," IWDM 2006, LNCS 4046, pp. 76-83, 2006.

Jorritsma, W. et al., "Improving the radiologist-CAD interaction: designing for appropriate trust," Clinical Radiology, 70 (2015) 115-122.

Vinyals, O. et al., "Show and Tell: A Neural Image Caption Generator," arXiv:1411.4555v2 [cs.CV], Apr. 20, 2015, 9 pages.

Extended European Search Report for European Application No. 17844275.2, dated Feb. 10, 2020, 11 pages.

Ye, C. et al., "Improved mass detection in 3D automated breast ultrasound using region based features and multi-view information", 2014, 36th Annual International Conference of the IEEE Engineering in Medicine and Biology Society, Aug. 26, 2014, pp. 2865-2868.

Boukerroui, D. et al., "Velocity Estimation in Ultrasound Images: A Block Matching Approach," In: Lecture Notes in Computer Science, C.J. Taylor and J.A. Noble (Eds.): IPMI 2003, LNCS 2732, pp. 586-598 (2003).

(56) References Cited

OTHER PUBLICATIONS

Examination Report No. 1 for Australian Application No. 2017316625, dated Aug. 23, 2021, 4 pages.
Notice of Reasons for Allowance for Japanese Application No. 2019-509494, dated Aug. 30, 2021, 4 pages.
Notice of Reasons for Rejection for Japanese Application No. 2019-529462, dated Jul. 2, 2021, 4 pages.
Office Action for European Application No. 17844275.2, dated Oct. 27, 2021, 5 pages.

* cited by examiner

METHOD AND SYSTEM OF COMPUTER-AIDED DETECTION USING MULTIPLE IMAGES FROM DIFFERENT VIEWS OF A REGION OF INTEREST TO IMPROVE DETECTION ACCURACY

CROSS-REFERENCE TO RELATED APPLICATION

This application is a continuation of U.S. patent application Ser. No. 15/338,707, filed Oct. 31, 2016, which claims priority to U.S. Patent Application No. 62/377,945 filed Aug. 22, 2016, all entitled "Method and System of Computer-Aided Detection Using Multiple Images from Different Views of a Region of Interest to Improve Detection Accuracy," the entire contents of each of which is herein incorporated by reference in its entirety.

FIELD

The present inventive concept relates generally to the field of computer-aided detection of medical images and the detection of suspicious abnormalities or lesions. In particular, the present inventive concept relates to a method and system for processing medical images which uses optical flow and block matching methods to determine the persistence of a potential lesion detected over multiple images collected from different viewpoints and over a period of time.

BACKGROUND

Computer-Aided Diagnosis (CAD), sometimes referred to as CADe or CADx, is used in the diagnosis of abnormal brain, breast cancer, lung cancer, colon cancer, prostate cancer, bone metastases, coronary artery disease, congenital heart defect, and Alzheimer's disease. Conventional systems are used to detect lesions in a single image. These systems require the extraction of features which characterize the boundary shape of the lesion (morphology features) and the homogeneity of the grey level within the lesion (texture features). The variation in size, shape, orientation, as well as ill-defined or diffused boundaries of lesions and background noise makes it difficult to detect a true lesion from other ultrasound artifacts found in the body.

Ultrasound medical imaging systems must address numerous artifacts which can make the detection of lesions more difficult. Generally ultrasound artifacts can cause false detections and sometimes mask true detections of lesions. Common artifacts encountered in ultrasound imaging include: anisotropy, reverberation, acoustic shadowing, acoustic enhancement, edge shadowing, beam width artifact, slice thickness artifact, side lobe artifact, mirror image, double image, equipment-generated artifact, and refraction artifact.

Anisotropy is the effect that makes a tendon appear bright when it runs at 90 degrees to the ultrasound beam, but dark when the angle is changed. The reason for this is that at particularly smooth boundaries, the angle of reflection and incidence are the same, just as they are with a conventional mirror. Reverberation is the production of false echoes due to repeated reflections between two interfaces with high acoustic impedance mismatch. Acoustic shadowing on an ultrasound image is characterized by a signal void behind structures that strongly absorb or reflect ultrasonic waves. Acoustic enhancement, also called posterior enhancement or enhanced through transmission, refers to the increased echoes deep to structures that transmit sound exceptionally well. Ultrasound beam width artifact occurs when a reflective object located beyond the widened ultrasound beam, after the focal zone, creates false detectable echoes that are displayed as overlapping the structure of interest. Slice thickness artifacts are due to the thickness of the beam and are similar to beam width artifacts. Side lobe artefacts occur where side lobes reflect sound from strong reflector that is outside of the central beam, and where the echoes are displayed as if they originated from within the central beam. Mirror image artifact in ultrasonography is seen when there is a highly reflective surface in the path of the primary beam. Double image artifact is due to refraction of a region like a muscle which acts as a lens which generates a second image of a reflector. Equipment-generated artifacts due to incorrect settings can lead to artifacts occurring. Refraction artifacts are due to sound direction changes due to passing from one medium to another.

It is with these observations in mind, among others, that various aspects of the present inventive concept were conceived and developed.

SUMMARY

It has been discovered that determining a persistence property advantageously facilitates identification of true lesions from artifacts that are detected in some views but are not consistent with the motion field and/or block tracking information; and/or identification of true lesions from instantaneous anomalies that are only detected in a few temporal frames or appear at random locations that do not follow the motion field or tracking information. Accordingly, one implementation of the present inventive concept may take the form of a method, comprising: utilizing a computing device comprising a memory for storing instructions that are executed by a processor to perform operations of: accessing a plurality of image frames; identifying a region of interest from a first image frame of the plurality of image frames; and processing the first image frame and a second image frame of the plurality of image frames to determine whether the region of interest is a false positive, by: comparing features of the first image frame with features of the second image frame to determine if the region of interest persists across the first image frame and the second image frame.

The aforementioned may be achieved in another aspect of the present inventive concept by providing a method of detecting a lesion or abnormality using a computer-aided detection system. The method includes the steps of collecting sequential image data, a video clip, volumetric set, and/or a sequence thereof and/or a combination thereof, collecting temporal/sequential information associated with the image data, and/or processing the image data and the temporal/sequential data to detect a difference associated with the image data and the temporal/sequential data and reduce a number of false positive lesion or abnormality detections. The image data may be 2D image data. The method may include the step of using at least one optical flow technique temporally to improve performance of the system.

The aforementioned may be achieved in another aspect of the present inventive concept by providing a computer-aided detection system configured to identify a region-of interest (ROI) with a high probability of containing a lesion or abnormality. The system may include a processor configured to reduce a number of false positives while preserving sensitivity or a number of true detections using temporal information. The temporal information may be determined using optical flow techniques. The system may include a correlation engine configured to determine correlations between ROIs found using traditional static CADe approaches for each image frame separately using tracking information. The processor may be configured to measure persistence as a number of frames that an ROI appears using the tracking information to determine false positives or low persistence and true positives or high persistence. The processor may be configured to measure persistence by determining a degree of overlap of a predicted ROI as given by a tracking motion vector. The ROI may be detected using the static CADe method. A greater degree of overlap may correspond to a higher probability of a true lesion or lower probability of a false positive.

The aforementioned may be achieved in another aspect of the present inventive concept by providing a system configured to detect a lesion or abnormality. The system may include a processor configured to receive image data and temporal information and/or a memory configured to store the image data and the temporal information. The processor may be configured to process the image data and the temporal data to detect a difference associated with the image data and the temporal data and reduce a number of false positive lesion or abnormality detections.

The aforementioned may be achieved in another aspect of the present inventive concept by providing a method of computer-aided detection to identify a region-of-interest (ROI) with a high probability of containing a lesion or abnormality, the method comprising the step of: using persistent spatial and/or temporal information associated with the two adjacent image frames to reduce a number of false positives while preserving or enhancing sensitivity or a number of true detections.

The aforementioned may be achieved in another aspect of the present inventive concept by providing a method of detecting a lesion or abnormality using a computer-aided detection system, the method comprising the steps of: collecting image data, a video clip, and/or a sequence; collecting temporal information associated with the image data; and processing the image data and the temporal data to detect a difference associated with the image data and the temporal data and reduce a number of false positive lesion or abnormality detections.

The aforementioned may be achieved in another aspect of the present inventive concept by providing a computer-aided detection system configured to identify a region-of-interest (ROI) with a high probability of containing a lesion or abnormality, the system comprising: a processor configured to reduce a number of false positives while preserving sensitivity or a number of true detections using temporal information.

The aforementioned may be achieved in another aspect of the present inventive concept by providing a system configured to detect a lesion or abnormality, the system comprising: a processor configured to receive image data and temporal information; and a memory configured to store the image data and the temporal information, wherein, the processor is configured to process the image data and the temporal data to detect a difference associated with the image data and the temporal data and reduce a number of false positive lesion or abnormality detections.

The aforementioned may be achieved in another aspect of the present inventive concept by providing a method, comprising: utilizing a computing device comprising at least one processing unit in communication with at least one tangible storage media, the tangible storage media including computer executable instructions for performing operations of: accessing sequential image frames associated with predetermined time intervals; identifying a region of interest associated with the sequential image frames; utilizing optical flow to generate tracking or mapping information between the sequential image frames; and generating a persistence value as a number of the sequential image frames that the region of interest appears or can be correlated between certain ones of the sequential image frames using the tracking or mapping information.

The aforementioned may be achieved in another aspect of the present inventive concept by providing an apparatus, comprising: a computer-aided detection (CAD) device operable to: utilize optical flow with image frames to a determine a temporal persistence value of a region of interest associated with the image frames over a predetermined period of time.

BRIEF DESCRIPTION OF DRAWINGS

For the purposes of description, but not of limitation, the foregoing and other aspects of the present inventive concept are explained in greater detail with reference to the accompanying drawings, in which.

Figure 1A:
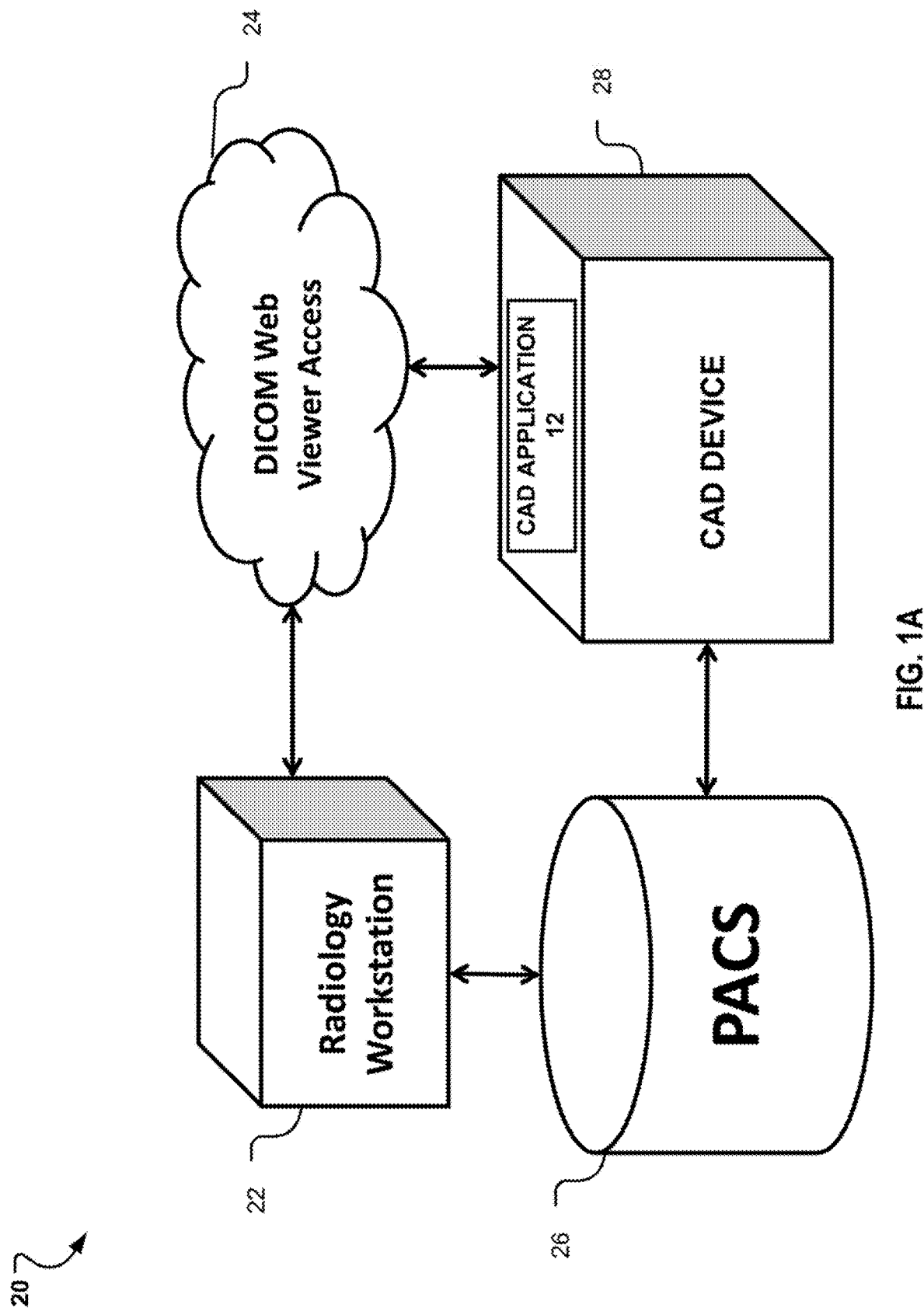
FIG. 1A depicts an exemplary system for implementing aspects of the present inventive concept.

The drawings do not limit the present inventive concept to the specific embodiments disclosed and described herein. The drawings are not necessarily to scale, emphasis instead being placed on clearly illustrating principles of certain embodiments of the present inventive concept.

DETAILED DESCRIPTION

The following detailed description references the accompanying drawings that illustrate various embodiments of the present inventive concept. The illustrations and description are intended to describe aspects and embodiments of the present inventive concept in sufficient detail to enable those skilled in the art to practice the present inventive concept. Other components can be utilized and changes can be made without departing from the scope of the present inventive concept. The following detailed description is, therefore, not to be taken in a limiting sense. The scope of the present inventive concept is defined only by the appended claims, along with the full scope of equivalents to which such claims are entitled.

I. Terminology

In the description, terminology is used to describe features of the present inventive concept. For example, references to terms "one embodiment," "an embodiment," "the embodiment," or "embodiments" mean that the feature or features being referred to are included in at least one aspect of the present inventive concept. Separate references to terms "one embodiment," "an embodiment," "the embodiment," or "embodiments" in this description do not necessarily refer to the same embodiment and are also not mutually exclusive unless so stated and/or except as will be readily apparent to those skilled in the art from the description. For example, a feature, structure, process, step, action, or the like described in one embodiment may also be included in other embodiments, but is not necessarily included. Thus, the present inventive concept may include a variety of combinations and/or integrations of the embodiments described herein. Additionally, all aspects of the present inventive concept as described herein are not essential for its practice.

The term "algorithm" refers to logic, hardware, firmware, software, and/or a combination thereof that is configured to perform one or more functions including, but not limited to, those functions of the present inventive concept specifically described herein or are readily apparent to those skilled in the art in view of the description. Such logic may include circuitry having data processing and/or storage functionality. Examples of such circuitry may include, but are not limited to, a microprocessor, one or more processors, e.g., processor cores, a programmable gate array, a microcontroller, an application specific integrated circuit, a wireless receiver, transmitter and/or transceiver circuitry, semiconductor memory, or combinatorial logic.

The term "logic" refers to computer code and/or instructions in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium, e.g., electrical, optical, acoustical, or other form of propagated signals such as carrier waves, infrared signals, or digital signals. Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "user" is generally used synonymously herein to represent a user of the system and/or method of the present inventive concept. For purposes herein, the user may be a clinician, a diagnostician, a doctor, a technician, a student, and/or an administrator.

The terms "identified," "processed," and "selected" are generally used synonymously herein, regardless of tense, to represent a computerized process that is automatically performed or executed by the system in one or more processes via at least one processor.

The acronym "CAD" means Computer-Assisted Diagnosis.

The term "client" means any program of software that connects to a CAD lesion application.

The term "server" typically refers to a CAD lesion application that is listening for one or more clients unless otherwise specified.

The term "post-processing" means an algorithm applied to an inputted ultrasound image.

The acronym "PACS" means Picture Archival and Communication System.

The acronym "GSPS" means Grayscale Softcopy Presentation State.

The acronym "DICOM" means Digital Imaging and Communications in Medicine.

The acronym "UI" means User Interface.

The acronym "PHI" means Private Health Information.

The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As the present inventive concept is susceptible to embodiments of many different forms, it is intended that the present inventive concept be considered as an example of the principles of the present inventive concept and not intended to limit the present inventive concept to the specific embodiments shown and described.

II. General Architecture

A trained medical professional such as a radiologist will generally attempt to identify and classify regions of suspicion or regions of interest within a medical image either manually or by using computer software. The radiologist may then manually characterize each region of suspicion in accordance with a relevant grading system. For example, suspicious regions of interest within the breast, which may include cancerous lesions, may be characterized according to Breast Imaging Reporting and Data Systems (BI-RADS) guidelines.

Ultrasound technologists may be trained to move a transducer around a region of interest (ROI) to obtain various viewpoints in order to reduce the uncertainty in detecting lesions due to artifacts and noise that can cause detection errors. A true lesion may be identified from different viewpoints whereas most artifacts will change significantly with a different viewing angle. According to aspects of the present inventive concept, observation of various viewpoints of a region of interest may be a major factor to the optimum detection of lesions by human operators. Conventional CADe systems generally look at only one image or two orthogonal images of a ROI to detect if a lesion is present in the field of view (FOV). The present inventive concept contemplates determining the portions of the ROI that persist over a plurality of various viewing angles which can be analyzed by a CAD system as described herein in real-time or offline.

Aspects of the present inventive concept comprise a system and method to process medical images using optical flow and block matching (or tracking) methods, or by generating a mapping function of ROIs between adjacent images in a sequence. A mapping function of the present inventive concept may involve amplitude and vector mappings to determine motion or tracking information between consecutive temporal frames of medical images from varying viewpoints.

Optical flow or optic flow may be described as a pattern of objects, surfaces, edges, or other visual characteristics of a given image (or set of images) taking into account relative motion associated with the image. Optical flow methods may be used to calculate the motion between two image frames based on time intervals. Using sets of images, in sequence, motion may be estimated as image velocities or discrete image displacements. Optical flow methods as described herein may include phase correlation, block-based methods, differential methods, discrete optimization methods, and the like. In one embodiment, block based methods may be utilized to minimize the sum of squared differences or sum of absolute differences, or to maximize normalized cross-correlation associated with adjacent images in a sequence. Tracking methods may also be utilized. Specifically, feature-tracking may be utilized which comprises the extraction of visual features such as corners and textured areas and tracking them over multiple frames. As one example of implementing feature tracking, given two subsequent frames, point translation can be estimated.

The mapping or tracking information may be used to determine whether image frames can be correlated based on regions of interest (ROIs) found in each temporal frame using static two dimensional (2D) CADe approaches. Frames of an image or multiple images can also be simulated as a sequence derived from sequential traverses through arbitrary angles in volumetric whole breast ultrasound data. Using the system and method of the present inventive concept, a true lesion may appear as an ROI that can be tracked over several viewpoints. On the other hand, false positives may be shown to persist for a relatively few number of viewpoints and appear at locations that are not correlated to the optical flow and block matching tracking information of the ROI.

As such, the present inventive concept overcomes the limitation of current CADe systems by processing adjacent images from multiple views of a region of interest, i.e., a plurality of images of a region of interest with each of the plurality of images being of a different view of the region of interest. It is foreseen that the system and method of the present inventive concept may utilize multiple images of the same view of the region of interest without deviating from the scope of the present inventive concept. The plurality of images may be used to reduce the interfering effects of artifacts in the computer assisted detection CADe of lesions.

The present inventive concept advantageously utilizes information pertaining to a multitude of viewpoints obtained from varying the transducer angle or simulating sequences from volumetric whole breast ultrasound data to improve the performance over current single, double, or volumetric viewpoint image CADe systems. For example, a sequence of images for a specific region of interest may be processed to find displacement vectors of patches of the image from one image to the next in the sequence. Patches are defined as having similar sets of morphological and texture features within the patch across the sequence of images. The resulting displacement vectors and average grey scale change of a patch throughout a sequence are used to increase or decrease the probability of detection of a lesion using the CADe for the ROI.

Further, the persistence of the ROI between images may be used to provide a confidence level of the lesion detected from a static CADe system. The operator may record images for CADx diagnosis at and around the regions of interest with the highest confidence levels.

FIG. 1A illustrates an exemplary CAD system 20 which may be utilized to perform an image analysis process comprising one or more stages. As shown, the CAD system 20 may comprise a radiology workstation 22, a DICOM web viewer access 24, a PACS server 26, and a CAD device 28. The radiology workstation 22 may comprise at least one high-definition monitor, an adjustable clinician/operator desk, a power supply, a desktop computer or other such computing device, cable peripherals, a power supply, and PACS-specific peripheral such as a PACS back light, and PACS monitor device holders/frames.

The PACS server 26 may comprise a system for digital storage, transmission, and retrieval of medical images such as radiology images. The PACS server 26 may comprise software and hardware components which directly interface with imaging modalities. The images may be transferred from the PACS server 26 to external devices for viewing and reporting. The CAD device 28 may access images from the PACS server 26 or directly from the radiology workstation 22.

The CAD device 28, which may comprise a CAD web and processing server or other CAD computing device may comprise at least one of an application server, web server, processing server, network server, mainframe, desktop computer, or other computing device. The CAD device 28 may further comprise at least one Windows based, tower, or rack form factor server. The CAD device 28 may be operable to provide a client side user interface implemented in JavaScript, HTML, or CSS. The CAD device 28 may comprise a server side interface implemented in e.g. Microsoft ASP/.NET, C #/PHP, or the like. The CAD device 28 may utilize one or more cloud services to extend access and service to other devices, such as the radiology workstation 22.

The CAD device 28 may communicate with the radiology workstation 22 via a network using the DICOM web viewer access 24, a web interface, or using one or more of an application programming interface (API). The DICOM web viewer access 24 may comprise a medical image viewer and may run on any platform with a modern browser such as a laptop, tablet, smartphone, Internet television, or other computing device. It is operable to load local or remote data in DICOM format (the standard for medical imaging data such as magnetic resonance imaging (MM), computerized tomography (CT), Echo, mammography, etc.) and provides standard tools for its manipulations such as contrast, zoom, drag, drawing for certain regions of images, and image filters such as threshold and sharpening. In one embodiment, the radiology workstation 22 may communicate with the CAD device 28 by implementing the DICOM web viewer access 24 via a web browser of a computing device of the radiology workstation 22. It should be understood that aspects of the present inventive concept may be implemented solely on the CAD device 28 which may already have access to one or more medical images.

The CAD device 28 may implement aspects of the present inventive concept using a CAD application 12 developed in C++, but other programming languages are contemplated. The CAD application 12 may be compatible with and utilize aspects of an operating system such as Windows XP, Windows Vista, Windows 7, Windows 8, Windows 10, and their embedded counterparts. The CAD lesion application 12 may be hardware agnostic and may be implemented on a variety of different computing devices such as application servers, network servers, mainframes, desktop computers, or the like. The CAD application 12 may utilize an external interface which may be accessed by a user, such as a clinician.

The CAD application 12 may be installed to or otherwise reside on an operating system of a computing device, such as the CAD device 28. The CAD application 12 may comprise a self-contained application which need not rely upon any core functionality outside of the operating system within which it resides. The CAD application 12 may include a DICOM interface that allows the CAD lesion application 12 to receive DICOM data as well as return such data to the originator of the transaction.

Figure 1B:
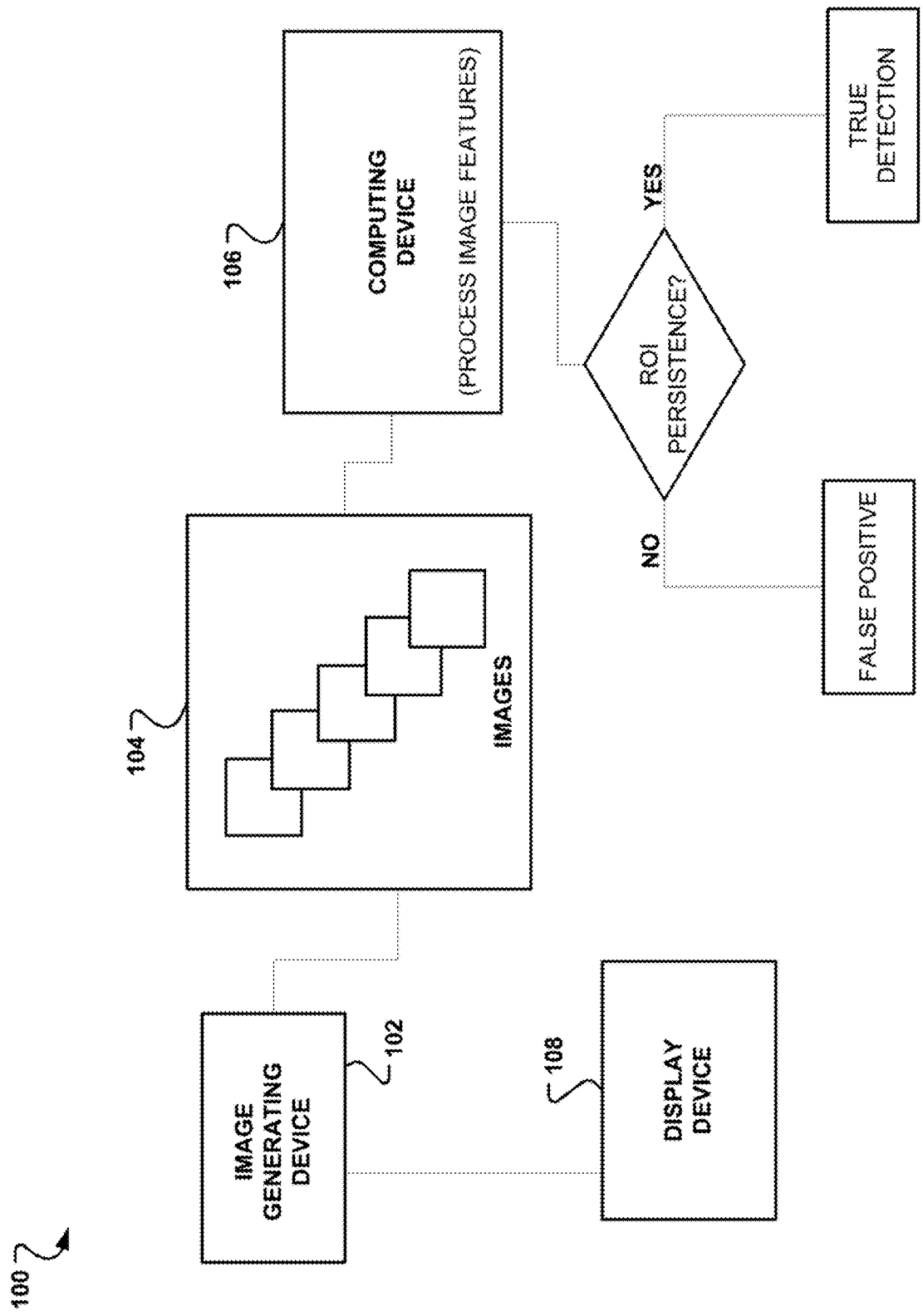
FIG. 1B depicts an exemplary system for implementing aspects of the present inventive concept.
Figure 2A:
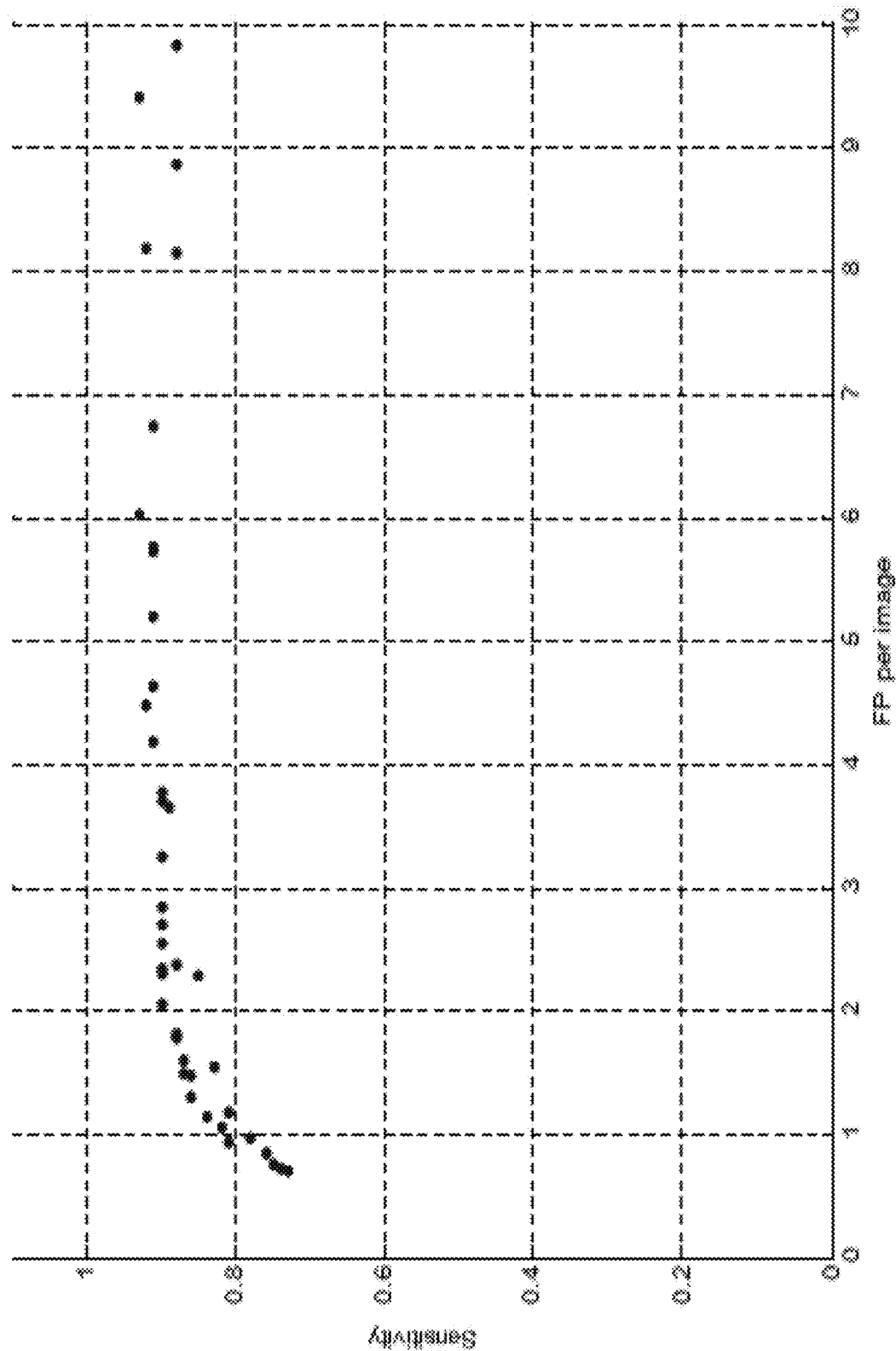
FIG. 2A illustrates a Free-response Receiver Operating Characteristic (FROC) curve of detection of lesions that are relatively more difficult to identify, and showing the sensitivity of true positives on the y-axis as a function of the number of false positives per image on the x-axis, with a trade-off in number of false positives versus sensitivity or true positive detection.
Figure 2B:
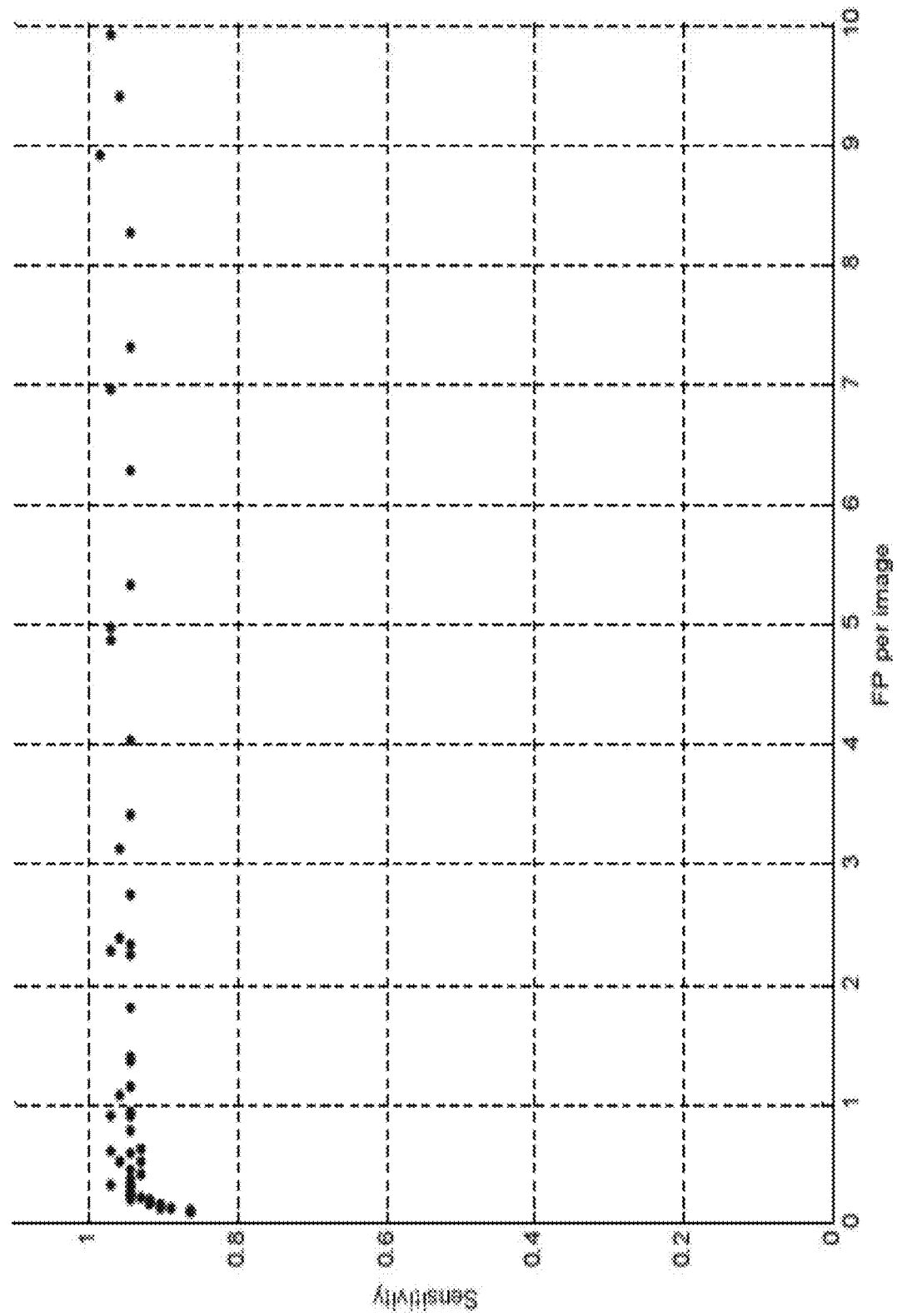
FIG. 2B illustrates a FROC curve of detection of lesions that are relatively less difficult to identify, and showing the sensitivity of true positives on the y-axis as a function of the number of false positives per image on the x-axis, with a trade-off in number of false positives versus sensitivity or true positive detection.
Figure 3A:
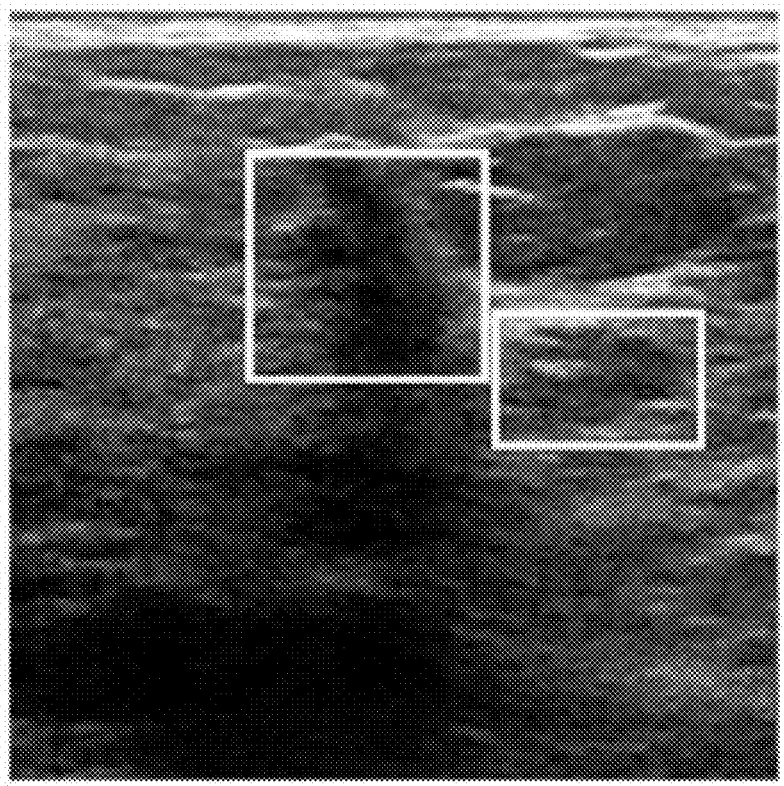
FIGS. 3A-3D illustrates how false positives detected in images of FIGS. 3A and 3C can be removed using one or more optical flow techniques of the present inventive concept to check on temporal persistence of regions of interest detected, as illustrated by FIGS. 3B and 3D.
Figure 3B:
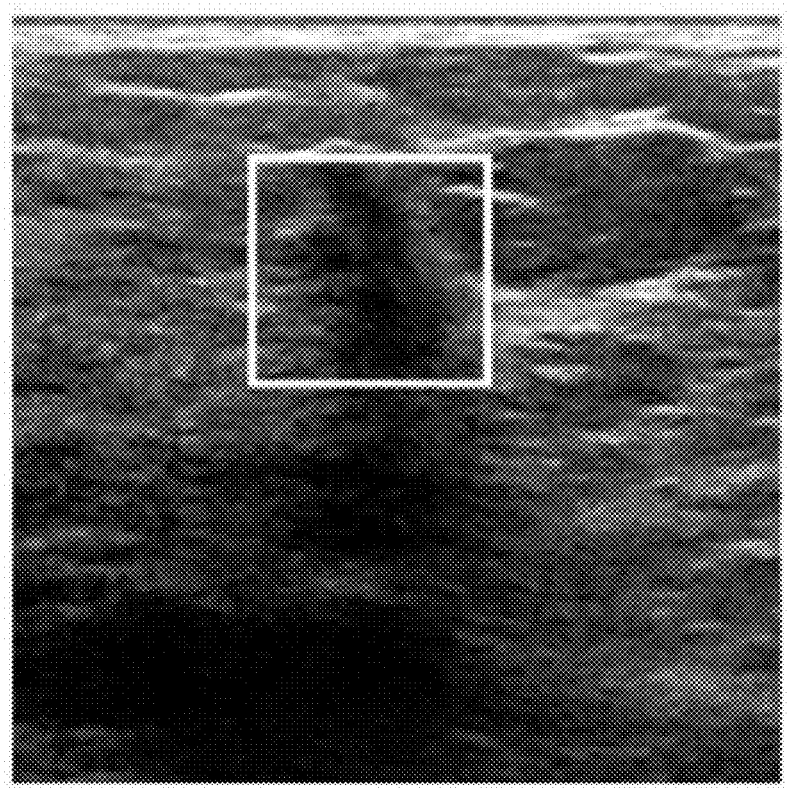
Figure 3C:
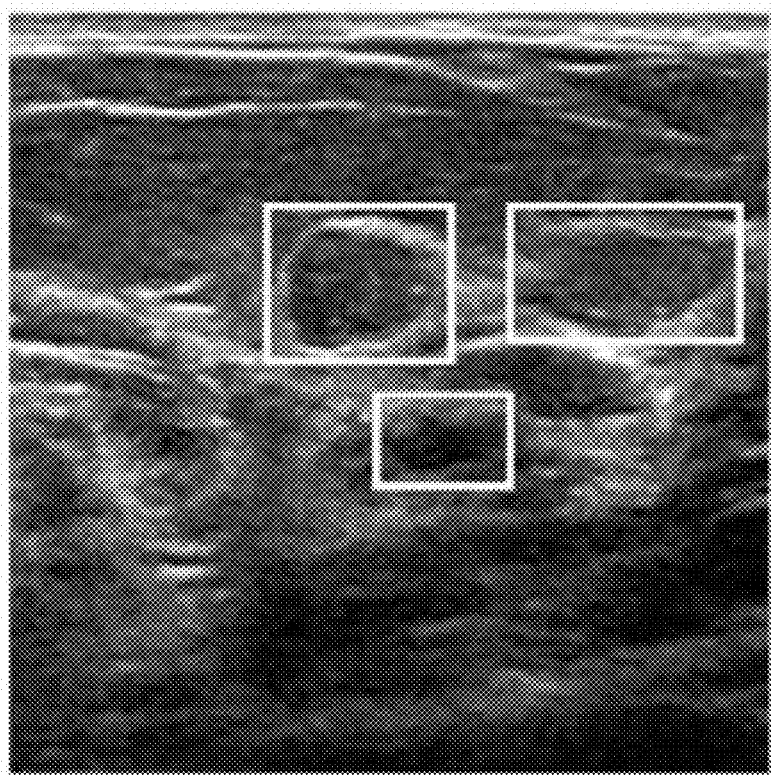
Figure 3D:
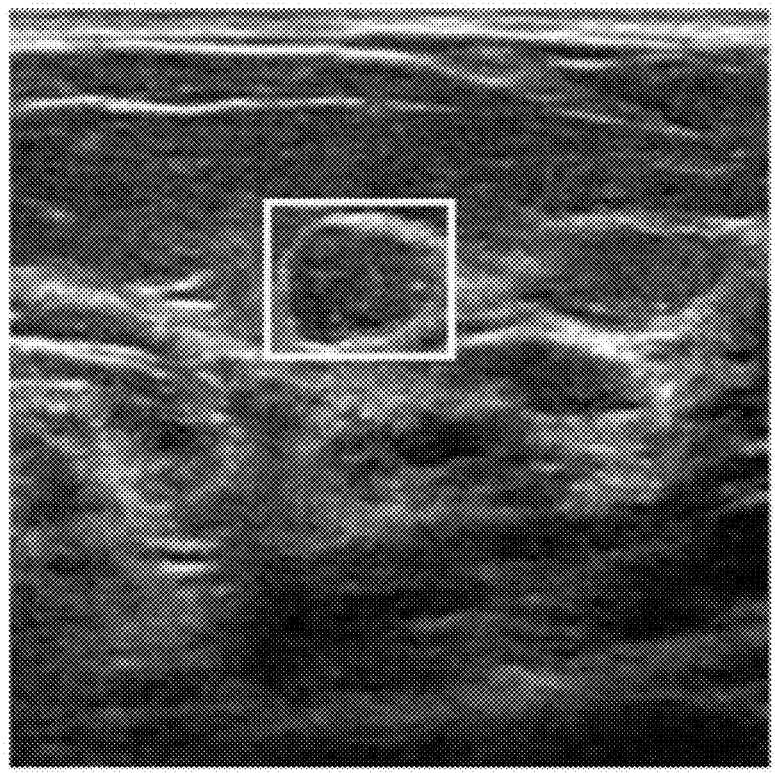
Figure 4A:
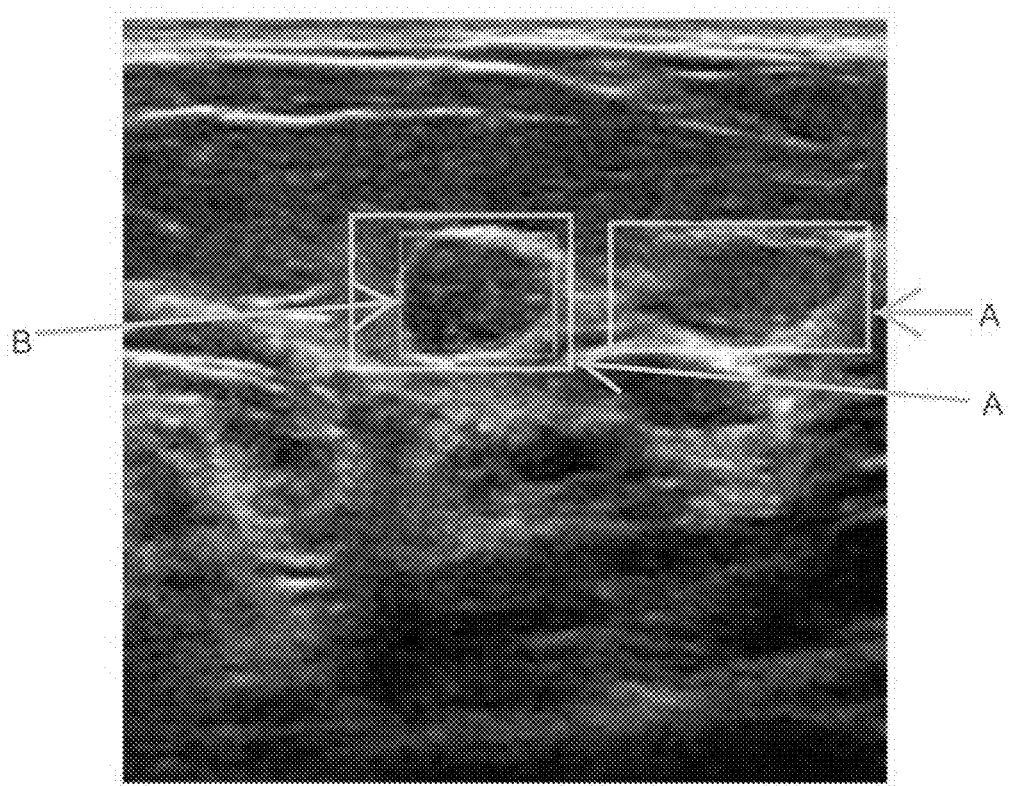
FIGS. 4A-4D illustrate detection results using optical flow indicated by A (i.e., external squares and squares without any internal square) compared to ground truth, e.g., true lesion boundaries, manually marked and shown by B (i.e., internal squares)
Figure 4B:
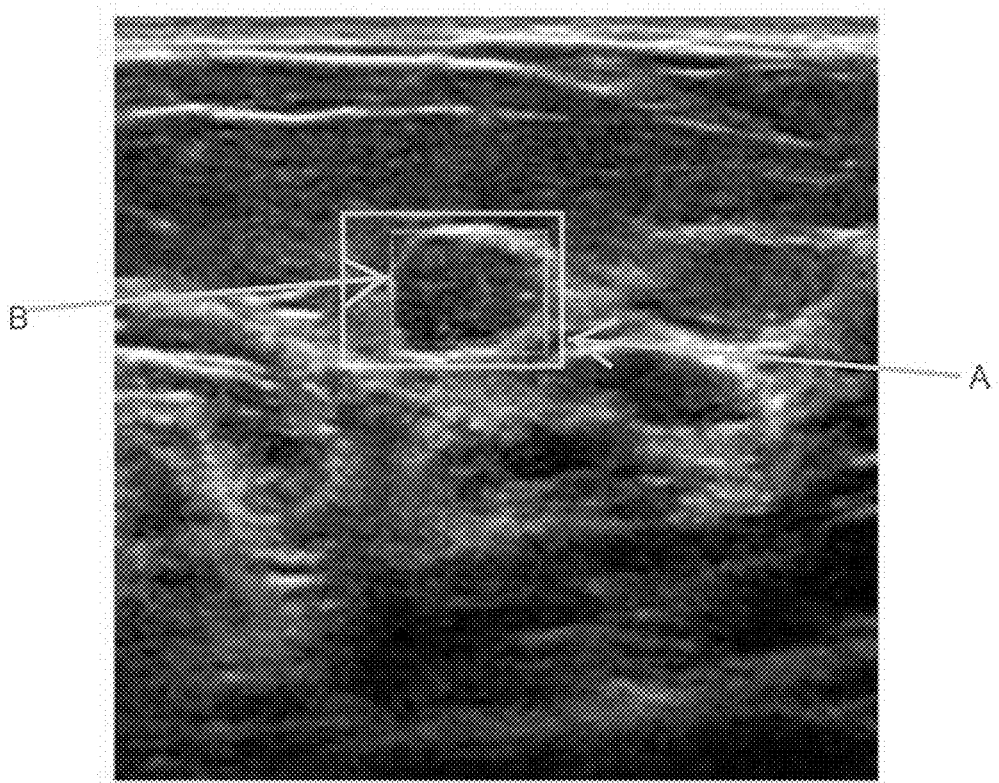
Figure 4C:
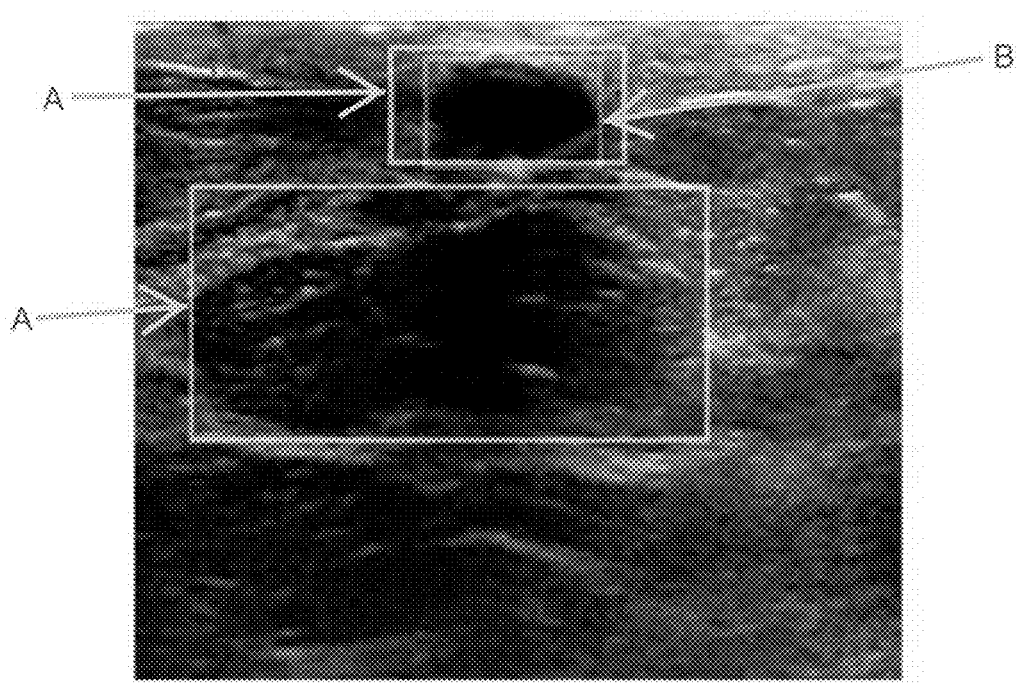
Figure 4D:
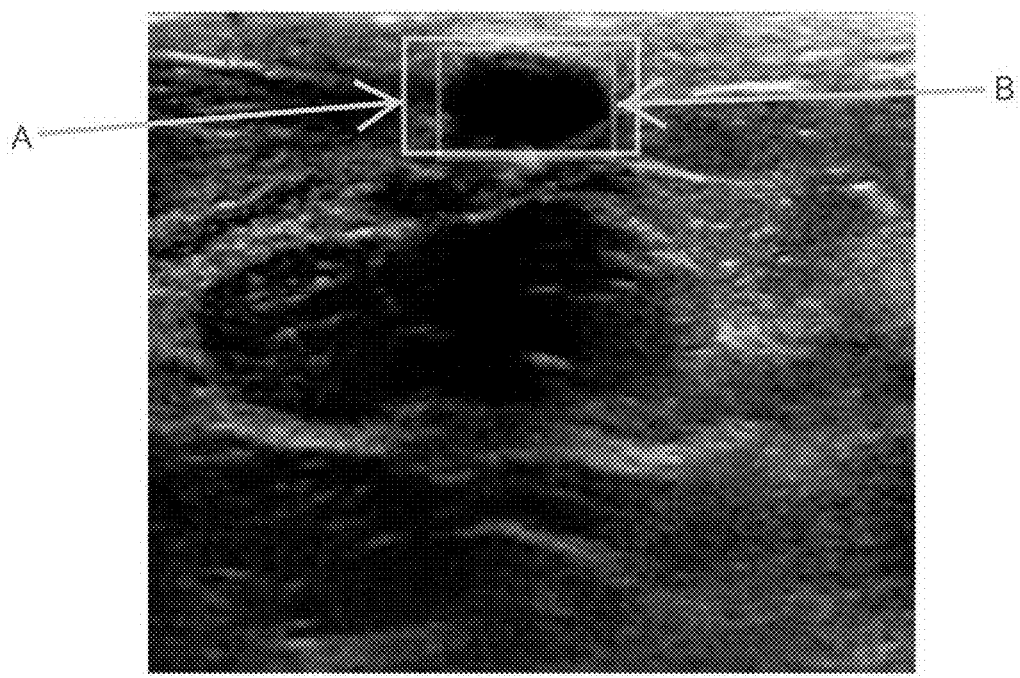
Figure 5A:
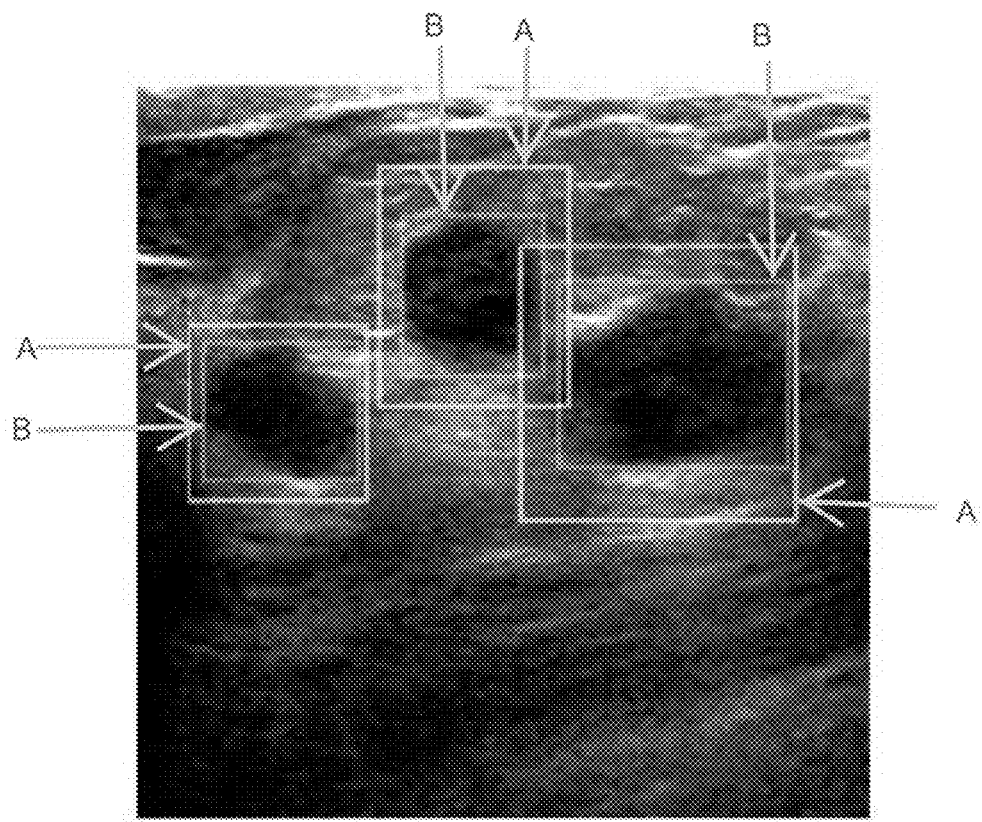
FIGS. 5A and 5B illustrate detection results using optical flow indicated by A (i.e., external squares and squares without any internal square) compared to ground truth manually marked and shown by B (i.e., internal squares)
Figure 5B:
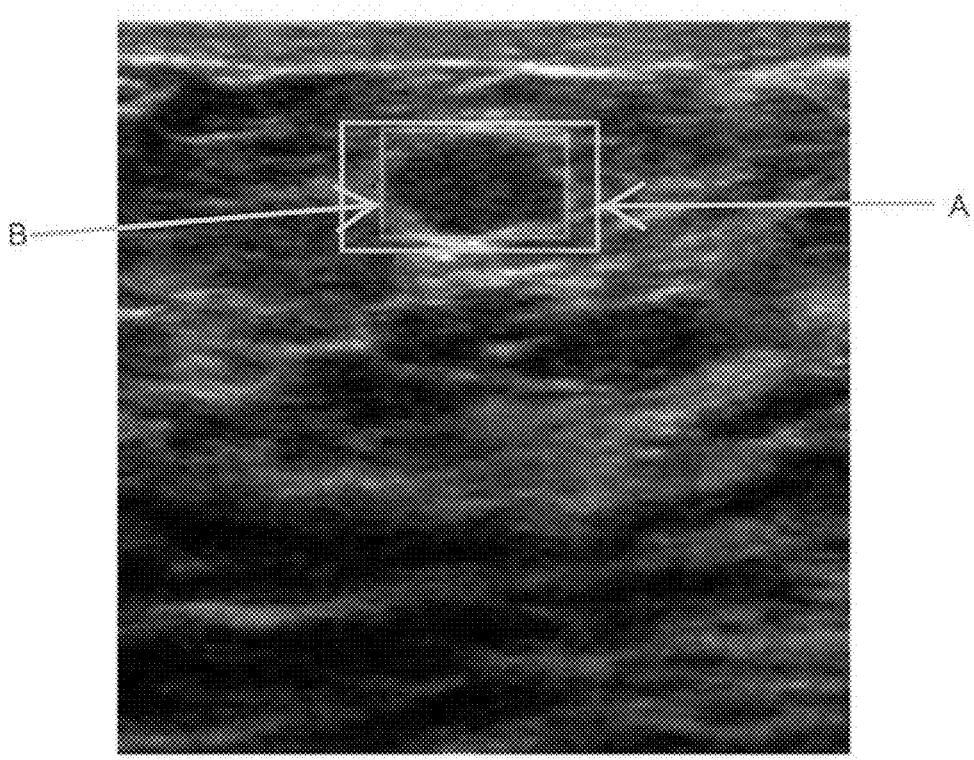
Figure 6A:
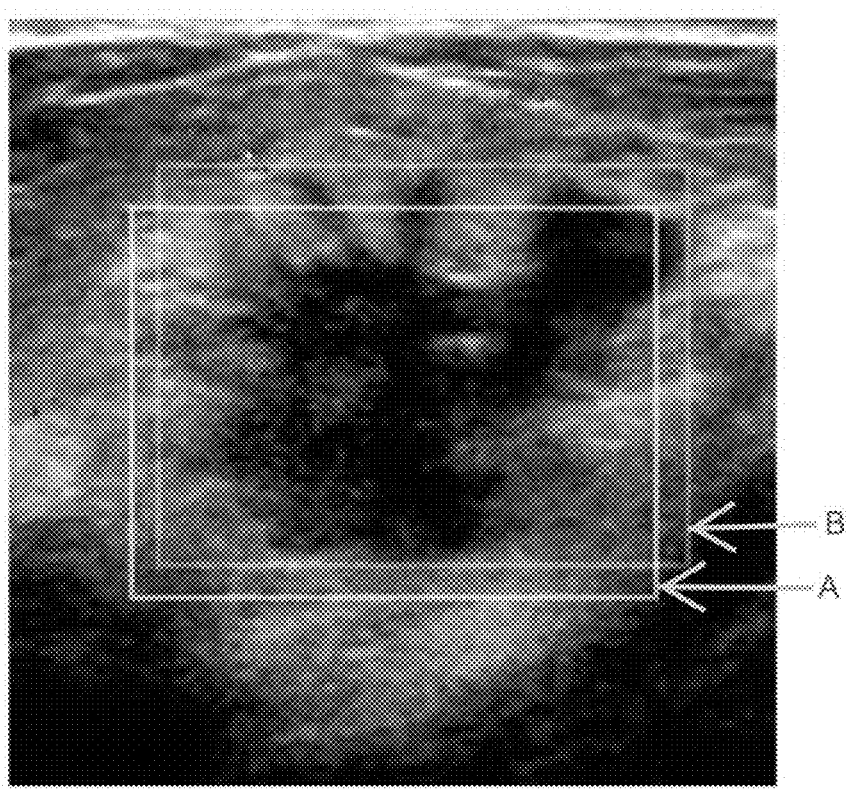
FIGS. 6A and 6B illustrate detection results using optical flow indicated by A compared to ground truth manually marked by B (i.e., uppermost-extending squares)
Figure 6B:
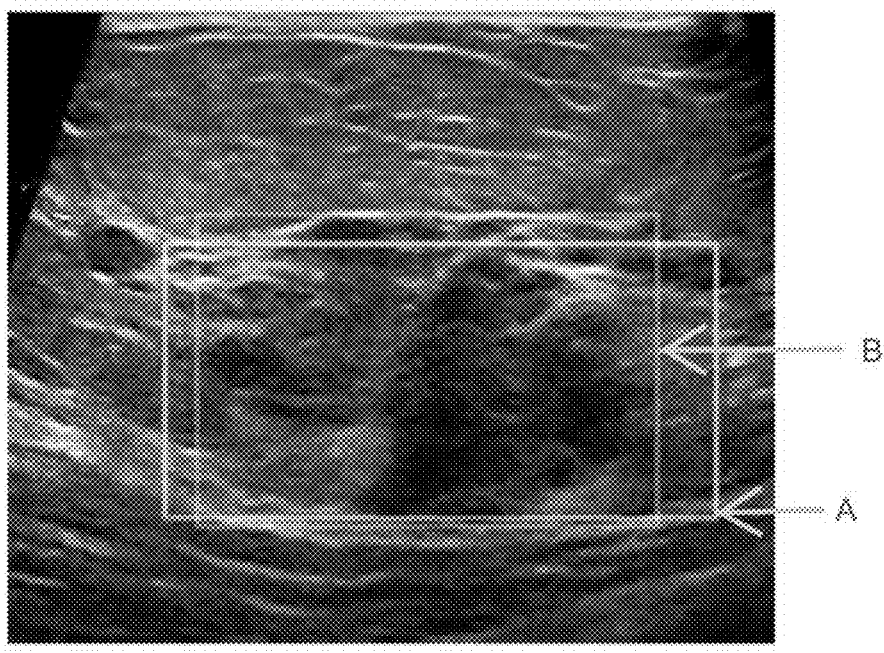
Figure 7A:
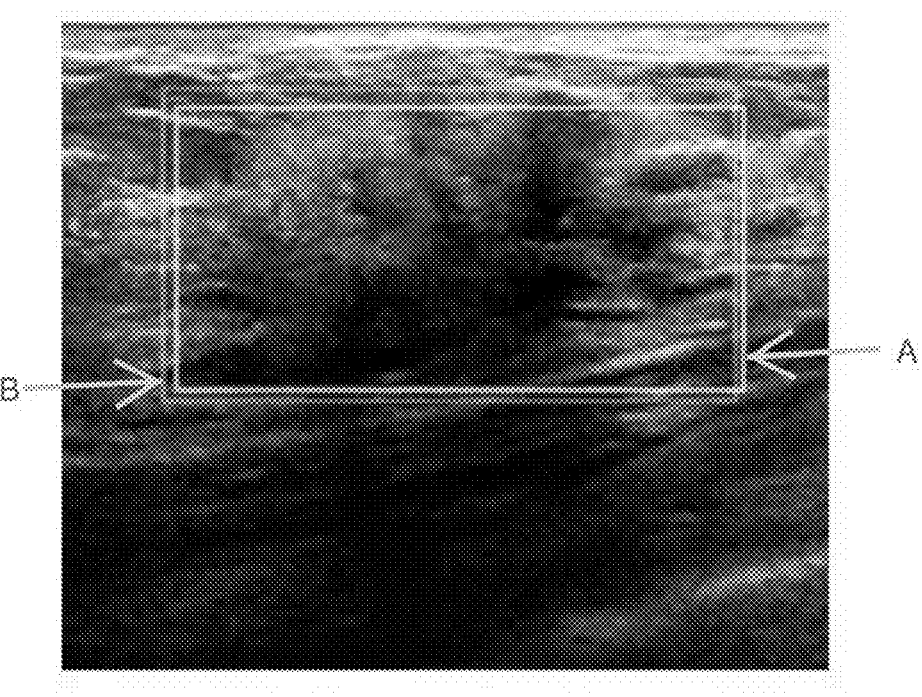
FIGS. 7A and 7B illustrate detection results using optical flow indicated by A compared to ground truth manually marked by B (i.e., leftmost-extending squares)
Figure 7B:
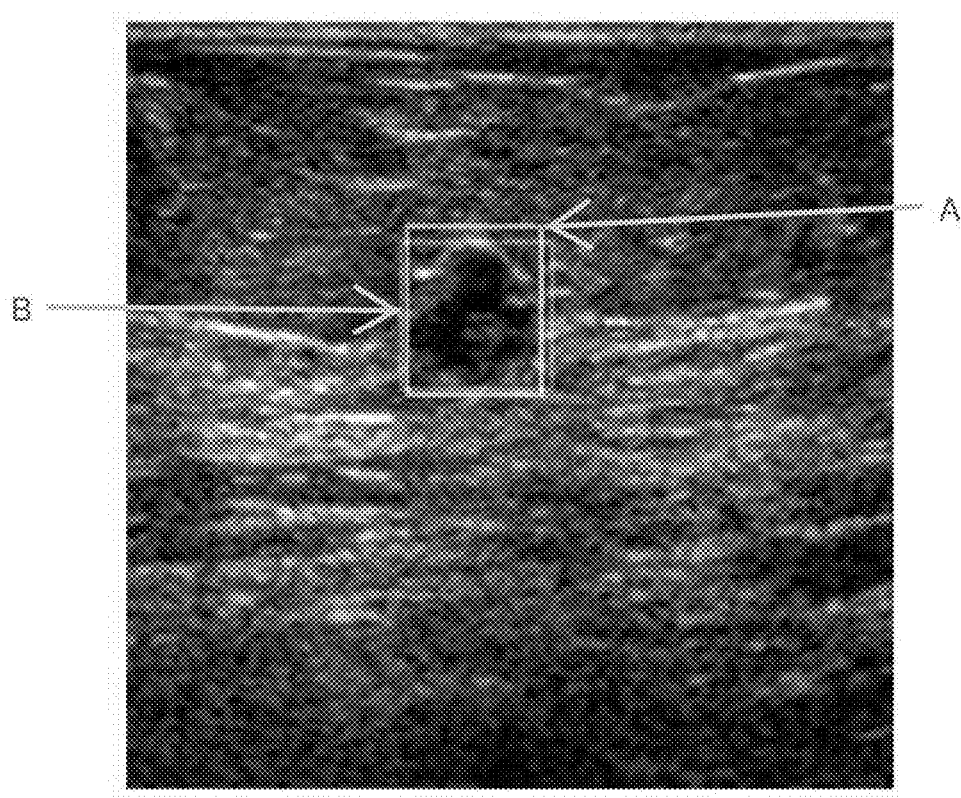
Figure 8A:
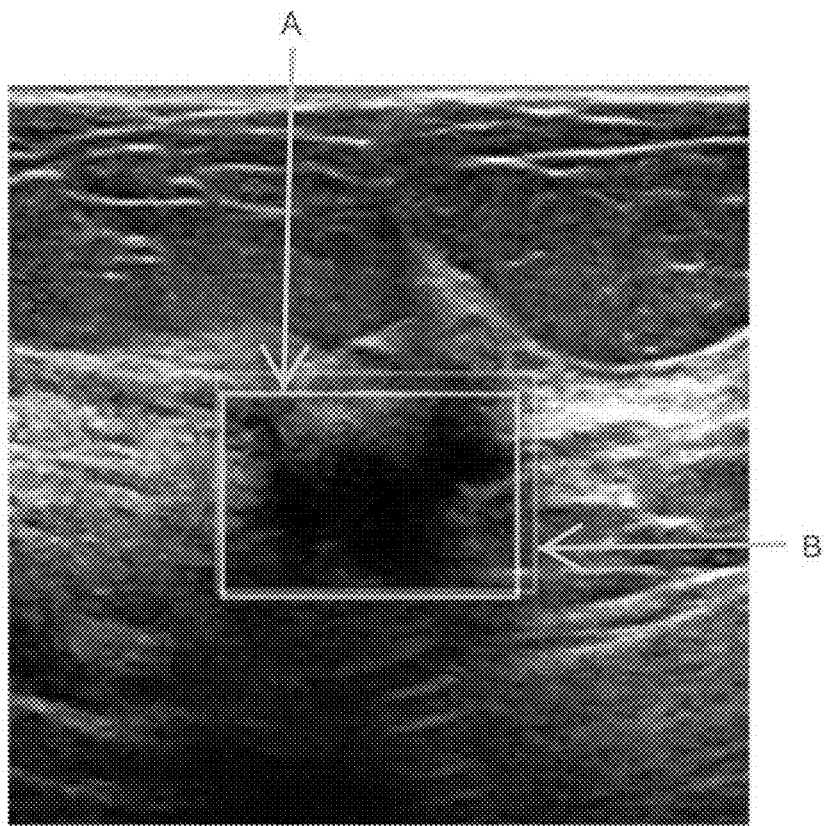
FIGS. 8A and 8B illustrate detection results using optical flow indicated by A compared to ground truth manually marked by B (i.e., leftmost and rightmost-extending squares)
Figure 8B:
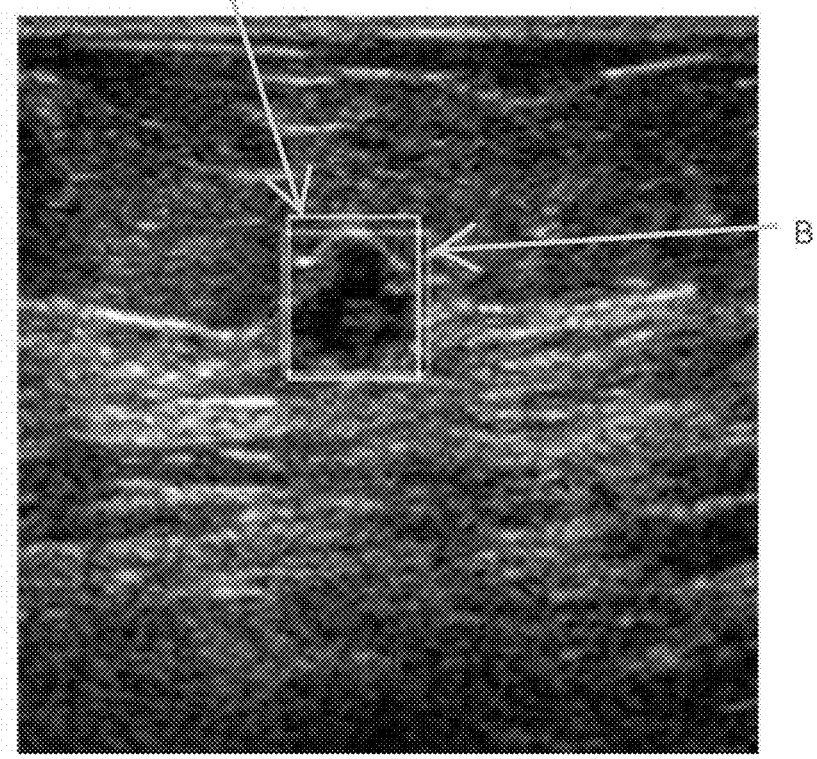
Figure 9:
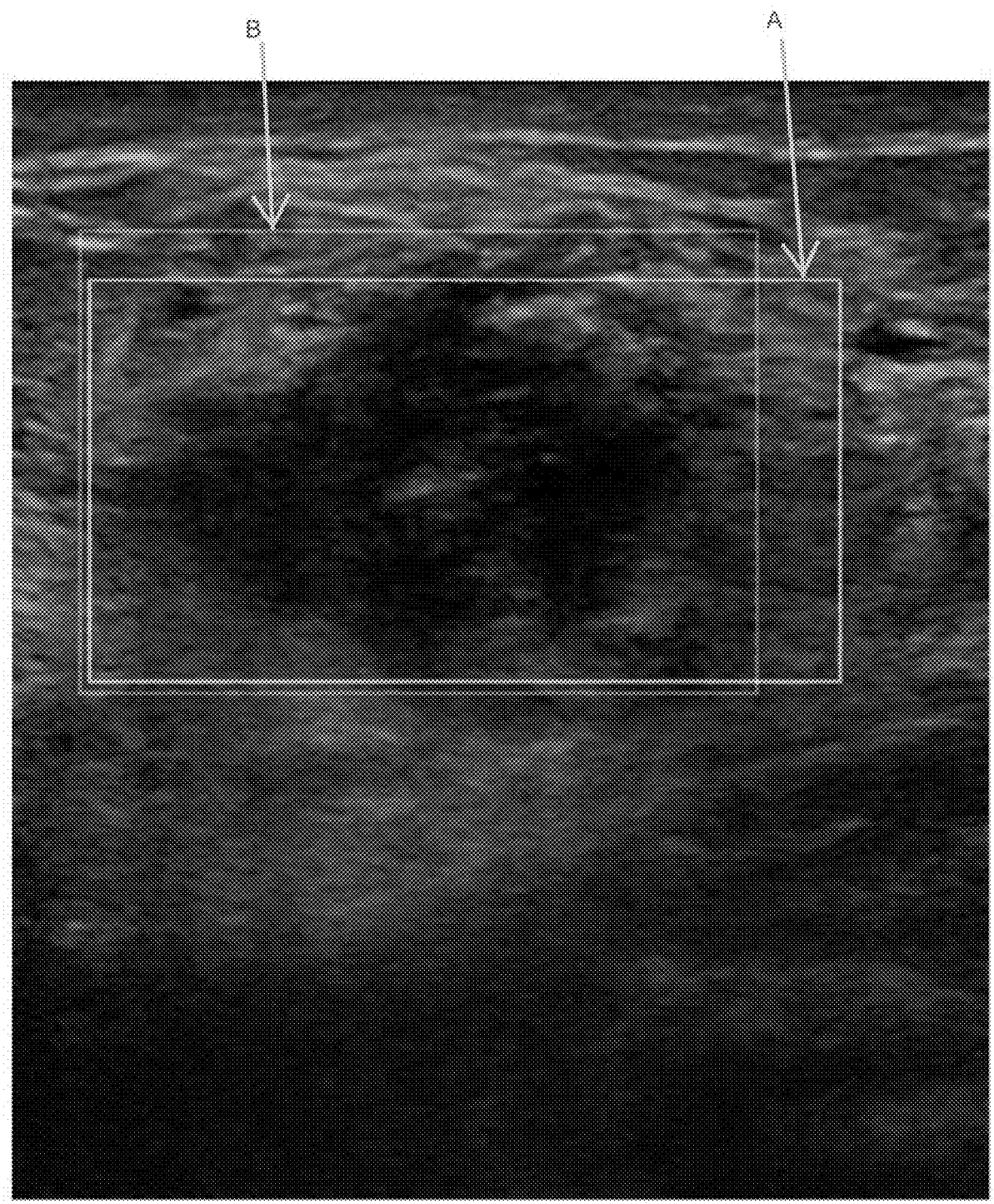
FIG. 9 illustrates detection results using optical flow indicated by A compared to ground truth manually marked by B (i.e., uppermost and lowermost-extending square)

FIG. 1B is another embodiment of a system 100 for implementing image processing including performing an image analysis process comprising one or more stages similar to the system 20 of FIG. 1A as described herein. As shown, the system 100 comprises an image generating device 102, a set of images 104 or image frames, and a computing device 106 for processing the images 104. It should be understood that the system 20 and system 100 are not mutually exclusive such that the inventive concept of CAD processing as described herein may involve features from the system 20 and/or the system 100.

FIGS. 1A and 1B may be explained with reference to the process flow 1000 of FIG. 10. In block 1002, a plurality of image frames may be accessed by a computing device. The computing device of FIG. 10 may be the CAD device 28, or the computing device 106. The computing device 106 is not limited to a CAD device and may be a desktop, laptop, or server or a mobile device. The image frames may be generated using the image generating device 102 which may include any number or type of image generating devices such as a transducer, a 3-D ultrasound, a fluoroscopy device using continuous X-ray beams, or the like. The image frames or images are depicted as the images 104 of FIG. 1B as generated using the image generating device 102. The images 104 may be taken over a temporal range, or may be generated based on spatial relationships and location. For example, an operator may move a transducer slightly over an area of a patient during a time period, and many of the images 104 may be generated during the time period, such that each of the images is associated with a predetermined time interval. In other embodiments, for example in the case of 3-D ultrasound, a plurality of images such as the images 104 may be taken nearly instantaneously. In this case, the images may be associated with a unique spatial identifier, i.e., the images may be associated with specific locations or sections of a patient as opposed to specific time intervals. As described herein, if a region of interest is determined to persist across multiple image frames over time or spatially, the ROI may be ruled out as a false positive.

As shown in block 1004, a region of interest is identified from a first image frame of the plurality of image frames of block 1002. In other words, block 1004 may comprise a stage of an image process/analysis that may include automatically detecting a region-of-interest (ROI) from the images 104 which might be a lesion or abnormality that requires further evaluation. This stage may be denoted CADe, where the subscript e indicates the detection of a putative lesion or abnormality within a region of interest. The plurality of image frames may be accessed from a PACS server such as the PACS server 26, or generated by the image generative device 102.

As described in block 1006, a computing device, such as the computing device 106 may be used to process the first image frame and other image frames of the images 104 to determine whether the region of interest (ROI) is a false positive or requires further analysis. More particularly, if an ROI is identified in block 1004 that may contain a lesion or anomaly, a CADx process/stage may be executed. In the CADx stage, the ROI is analyzed to determine the likelihood that the lesion contained therein is cancerous or benign. The subscript x indicates diagnosis. As shown in block 1008, the processing involves comparing features of the first image frame with features of other image frames to determine if the region of interest persists across or between multiple frames.

Processing image frames as described in block 1006 and block 1008, using a CADx stage, may involve a variety of different possible sub-methods such as optical flow, block based methods, mapping functions, or the like as described herein. For example, at least one processor of the CAD device 28 or the computing device 106 may be used to compute mapping between temporal/sequential frames via optical flow techniques and block matching to determine tracking information of objects between frames. Independent ROIs may be identified using static CADe techniques that process one image per viewpoint of the sequence. The tracking information may then be used to determine whether ROIs across frames are correlated to a persistent ROI. A true lesion or abnormality should persist over many frames whereas a false positive will not. The number of frames can be adapted by a user either manually or automatically, e.g., via an interface of a computing device or the CAD device 28, to control the reduction in false positives at the expense of lowering the true positive rate.

The degree of overlap of the ROIs, using the tracking information obtained with optical flow methods, can also be used to determine whether the lesion is the same between frames or if it is just two false positives. The degree of overlap can be adjusted in order to reduce more false positives or increase the number of true detections. The performance of the methods described herein has been found to reduce the number of false positives while keeping the same true positive rate that was achieved using static CADe approaches.

In one embodiment, to implement aspects of block 1006 and block 1008, image frames may be correlated with the first image frame by analyzing pixels and vectors associated with the region of interest. In other words, image frames may be correlated with the first image frame where the image frames and the first image frame depict similar pixels and vectors moving in the same direction.

It is contemplated that lesion morphology, texture, and other features extracted from images using the CAD system 20 or the system 100 may be used as features to train a classifier to detect putative lesions. Further, it is contemplated that static methods may be used to detect putative lesions for individual frames of video or still medical images. For purposes herein, the static methods are CADe methods that may process on one independent, two orthogonal image viewpoints, or some subset of captured or recapitulated images from a volumetric dataset. CADe methods are not limited to morphology and texture, but include any method that searches for suspicious areas within one image. For example, cascading Adaboost methods like the Viola-Jones method, convolutional neural networks (CNN), support vector machines (SVM) using Haralick and other features are techniques that may be used for static CADe methods. Using the CAD system 20 or system 100 and methods described herein with dynamic information available in real-time medical imaging applications, e.g., ultrasound imaging systems, performance of static CADe systems may be enhanced. Optical flow or optic flow is the pattern of apparent motion of objects, surfaces, and edges in a visual scene. Sequences of ordered images allow the estimation of motion as either instantaneous image velocities or discrete image displacements. Optical flow methods are divided into gradient-based or feature-based methods and can use stochastic or deterministic models of the objects whose motion is being estimated. Optical flow algorithms include but are not limited to phase correlation, block-based methods, differential methods like Lucas-Kanade method, Horn-Schunck method, Buxton-Buxton method, Black-Jepson method, general variational methods and discrete optimization methods. Block matching methods may be described here track grey scale changes in patches of pixels between images in a sequence.

In one embodiment, system and methods of the present inventive concept may advantageously calculate ROIs separately for each frame using a static-based CADe approach. The system and method of the present inventive concept could use the preferred method of optical flow methods to determine tracking information between consecutive frames in a video sequence of a ROI taken from various viewpoints. Specifically, the tracking information may be used to determine whether the ROI obtained independently in each frame using static CADe approaches can be correlated to each other using the optical flow vector field. Persistence is measured as the number of frames that an ROI can be tracked based on a percentage of overlap of the ROIs. The persistence factor is use to filter out putative lesions that have low persistence. Any ROI that is not tracked through several frames using optical flow methods may be determined or deemed to be a false positive. The persistence factor or number of frames can be adapted to reduce more false positives at the expense of a greater probability of a missed lesion. The degree overlap of the ROIs based on the tracked prediction and actual ROI location can also be adapted to reduce the number of false positives or increase the number of true positives. The aforementioned may be achieved in one aspect of the present inventive concept by providing a method of computer-aided detection to identify a region-of-interest (ROI) with a high probability of containing a lesion or abnormality.

In some embodiments, exemplary methods of utilizing a CAD system as described herein may include the step of using temporal information to reduce a number of false positives while preserving sensitivity or a number of true detections. The temporal information may be determined using optical flow techniques.

Exemplary methods may further include the step of determining correlations between ROIs found using traditional static CADe approaches for each image frame separately using tracking information. Exemplary methods may further include the step of measuring persistence as a number of frames that an ROI appears using the tracking information to determine false positives or low persistence and true positives or high persistence. Exemplary methods may further include the step of measuring persistence by determining a degree of overlap of a predicted ROI as given by a tracking motion vector. The present inventive concept can be implemented in real-time or on recorded video such as a cineloop. It is foreseen that any captured images and/or video by the present inventive concept may be two-dimensional images and/or video such as, but not limited to a cineloop. For instance, a cineloop, as used in an ultrasound procedure, may be incorporated into the process and/or method of the present inventive concept. Moreover, it is foreseen that at least one or more portions and preferably all portions of the systems and methods of the present inventive concept utilize and comply with Digital Imaging and Communications in Medicine (DICOM) format standards. In this manner, the system and methods of the present inventive concept utilize DICOM file format definitions, network communications protocols, and the like.

In addition to determining inter-frame correspondences and relationships, the optical flow methods described herein can be used to characterize tissue response to shear and compressive forces. These forces may be imparted by the operator applying pressure on the transducer, as they move it over the course of an examination. It is a well-known fact that, as a result of changes in cell density, certain types of lesions may exhibit differing levels of stiffness and deformability. The system described herein, in tracking the position and shape of a region of interest across spatial or temporal frames, may also infer the compressibility of that region with respect to its surroundings. It may then use this characterization to aid its determination of whether that region corresponds to abnormal or normal tissue.

Aspects of the present inventive concept may utilize one or more optical flow sensors to generate mapping or tracking information between images as described herein. An optical flow sensor may comprise a vision sensor operable to measure optical flow or visual motion and output a measurement. Various embodiments of an optical sensor as described may include an image sensor chip coupled to a processor with the processor operable to execute an optical flow application. Other embodiments may include a vision chip as an integrated circuit with an image sensor and a processor disposed on a common die or like component to increase density and reduce space.

In another embodiment, a process of temporally analyzing feature properties may be implemented (alone or in combination with the above) to improve detection accuracy. Determining a persistence property may facilitate to identify true lesions from instantaneous anomalies that are only detected in a few temporal frames or appear at random locations that do not follow the motion field or tracking information. Specifically, optical flow methods similar to those described above may be utilized to find a mapping function. Mapping or tracking information may be used to determine whether the tracking information can be correlated with regions of interest (ROIs) found in each temporal frame (or at least a plurality of temporal frames) using static (2D) CADe approaches. A true lesion may be identified as an ROI that can be tracked over many frames, with the understanding that false positives generally persist for very few frames and appear at random locations that are not correlated to the optical flow tracking information. In other words, the present novel concept advantageously utilizes temporal information to improve the performance of any static CADe system. The mapping function of the present inventive concept may include amplitude and vector mappings to determine motion or tracking information between consecutive temporal frames of medical images.

The present inventive concept may involve utilizing a CAD system, such as the CAD system 20, to perform an image analysis process which may include two stages. A first stage of the process may be to automatically detect a region-of-interest (ROI) which might be a lesion or abnormality that requires further evaluation. This stage may be denoted CADe, where the subscript e indicates the detection of a putative lesion or abnormality within a region of interest. If an ROI is identified that might contain a lesion or anomaly, then a next stage of the process, i.e., CADx, may be automatically executed. In the CADx stage, the ROI is analyzed to determine the likelihood that the lesion contained therein is cancerous or benign. The subscript x indicates diagnosis.

Using the systems described, computer-aided detection of medical images may be conducted to detect the temporal persistence of ROIs that are automatically detected in sequential video frames. Detection of temporal persistence of ROIs may be used to enhance the probability of detection of a true lesion or other abnormality while reducing the number of false positives. In one embodiment, the present inventive concept utilizes mapping between temporal frames via optical flow techniques to determine tracking information of objects between frames. Independent ROIs may be identified using static CADe techniques that process one frame at a time without any temporal information. The tracking information is used to determine whether ROIs across frames are correlated to the tracked group. A true lesion or abnormality should persist over many frames whereas a false positive will not. The number of frames can be adapted by a user either manually or automatically, e.g., via an interface of the present inventive concept and/or predetermined configurations, to control the reduction in false positives at the expense of lowering the true positive rate. The degree of overlap of the ROIs using the tracking information obtained with optical flow methods can also be used to determine whether the lesion is the same between the frames or if it is just two false positives. The degree of overlap can be adjusted in order to reduce more false positives or increase the number of true detections. The performance of the instant new dynamic method has been found to reduce the number of false positives while keeping the same true positive rate that was achieved using static CADe approaches.

It is foreseen that lesion morphology, texture and other features for classification, some of which may be commonly used features, may be used as features to train a classifier to detect putative lesions in this capacity. Further, it is foreseen that static methods may be used to detect putative lesions for individual frames of video or still medical images. For purposes herein, the static methods may include CADe methods. CADe methods are not limited to morphology and texture, but include any method that searches for suspicious areas within one image. For example, cascading Adaboost methods like the Viola-Jones method, convolutional neural networks (CNN), support vector machines (SVM) using Haralick and other features are techniques that may be used for static CADe methods. Using the system and method of the present inventive concept with dynamic information available in real-time medical imaging applications, e.g., ultrasound imaging systems, performance of static CADe systems may be heightened.

Optical flow or optic flow is the pattern of apparent motion of objects, surfaces, and edges in a visual scene. Sequences of ordered images allow the estimation of motion as either instantaneous image velocities or discrete image displacements. Optical flow methods are divided into gradient-based or feature-based methods and can use stochastic or deterministic models of the objects whose motion is being estimated. Optical flow algorithms include but are not limited to phase correlation, block-based methods, differential methods like Lucas-Kanade method, Horn-Schunck method, Buxton-Buxton method, Black-Jepson method, general variational methods and discrete optimization methods.

In one embodiment, the system and method of the present inventive concept advantageously utilizes a matching process between sequential frames of video images to improve the probability of detecting a true lesion in a detected ROI. The system and method of the present inventive concept advantageously utilizes optical flow methods to match sub-regions of a ROI within one image with similar sub-regions of another image.

In one embodiment, the system and method of the present inventive concept advantageously calculates ROIs separately for each frame using a static-based CADe approach. The system and method of the present inventive concept may further utilize optical flow methods to determine tracking information between consecutive frames in a video sequence. The tracking information is used to determine whether ROIs obtained independently in each frame using static CADe approaches can be correlated to each other using the optical flow vector field. Persistence is measured as the number of frames that an ROI can be tracked based on a percentage of overlap of the ROIs. The persistence factor is use to filter out putative lesions that have low persistence. Any ROI that is not tracked through several frames using optical flow methods is determined to be a false positive. The persistence factor or number of frames can be adapted to reduce more false positives at the expense of a greater probability of a missed lesion. The degree overlap of the ROIs based on the tracked prediction and actual ROI location can also be adapted to reduce the number of false positives or increase the number of true positives.

The aforementioned may be achieved in one aspect of the present inventive concept by providing a method of computer-aided detection to identify a region-of-interest (ROI) with a high probability of containing a lesion or abnormality. The method may include the step of using temporal information to reduce a number of false positives while preserving sensitivity or a number of true detections. The temporal information may be determined using optical flow techniques.

Methods may include the step of determining correlations between ROIs found using traditional static CADe approaches for each image frame separately using tracking information. The method may include the step of measuring persistence as a number of frames that an ROI appears using the tracking information to determine false positives or low persistence and true positives or high persistence. The method may further include the step of measuring persistence by determining a degree of overlap of a predicted ROI as given by a tracking motion vector.

It is foreseen that any captured images and/or video by the present inventive concept may be two-dimensional images and/or video such as, but not limited to a cineloop. For instance, a cineloop, as used in an ultrasound procedure, may be incorporated into the process and/or method of the present inventive concept. Moreover, it is foreseen that at least one or more portions and preferably all portions of the systems and methods of the present inventive concept utilize and comply with Digital Imaging and Communications in Medicine (DICOM) format standards. In this manner, the system and methods of the present inventive concept utilize DICOM file format definitions, network communications protocols, and the like.

The ROI may be detected using the static CADe method. A greater degree of overlap may correspond to a higher probability of a true lesion or lower probability of a false positive.

The aforementioned may be achieved in another aspect of the present inventive concept by providing a method of detecting a lesion or abnormality using a computer-aided detection system. The method include the steps of collecting image data, a video clip, and/or a sequence thereof and/or a combination thereof, collecting temporal information associated with the image data, and/or processing the image data and the temporal data to detect a difference associated with the image data and the temporal data and reduce a number of false positive lesion or abnormality detections. The image data may be 2D image data. The method may include the step of using at least one optical flow technique temporally to improve performance of the system.

The aforementioned may be achieved in another aspect of the present inventive concept by providing a computer-aided detection system configured to identify a region-of-interest (ROI) with a high probability of containing a lesion or abnormality. The system may include a processor configured to reduce.

A system of the present disclosure may include a correlation engine, executed by a processor (of e.g. CAD device 28) configured to determine correlations between ROIs found using traditional static CADe approaches for each image frame separately using tracking information. The processor may be configured to measure persistence as a number of frames that an ROI appears using the tracking information to determine false positives or low persistence and true positives or high persistence. The processor may be configured to measure persistence by determining a degree of overlap of a predicted ROI as given by a tracking motion vector. The ROI may be detected using the static CADe method. A greater degree of overlap may correspond to a higher probability of a true lesion or lower probability of a false positive.

The aforementioned may be achieved in another aspect of the present inventive concept by providing a system configured to detect a lesion or abnormality. The system may include a processor configured to receive image data and temporal information and/or a memory configured to store the image data and the temporal information. The processor may be configured to process the image data and the temporal data to detect a difference associated with the image data and the temporal data and reduce a number of false positive lesion or abnormality detections.

In sum, computer-aided detection (CAD or CADe) systems may be used to detect lesions or regions of interest (ROIs) in medical images. CAD systems may use morphology and texture features for estimating the likelihood of an ROI containing a lesion within an image. The large variation in the size, shape, orientation, as well as ill-defined boundaries of lesions and background noise makes it difficult to differentiate actual lesions from normal background structures or tissue characteristics. Conventional detection methods may generate many false positives or a detection of a lesion when one is not present when the system is set for an acceptable number of false negatives or missed lesions. In mammography CAD, it is usual to have thousands of false positives for every one true detected cancer making the system inefficient for radiologists to use. The present inventive concept described overcomes this limitation by using optical flow methods to identify ROIs that are detected with persistence over time. The property of persistence of a potential lesion helps reduce false positives as well as improves the probability of detection of true lesions. This new dynamic method offers improved performance over static CADe methods for automatic ROI lesion detection.

Figure 10:
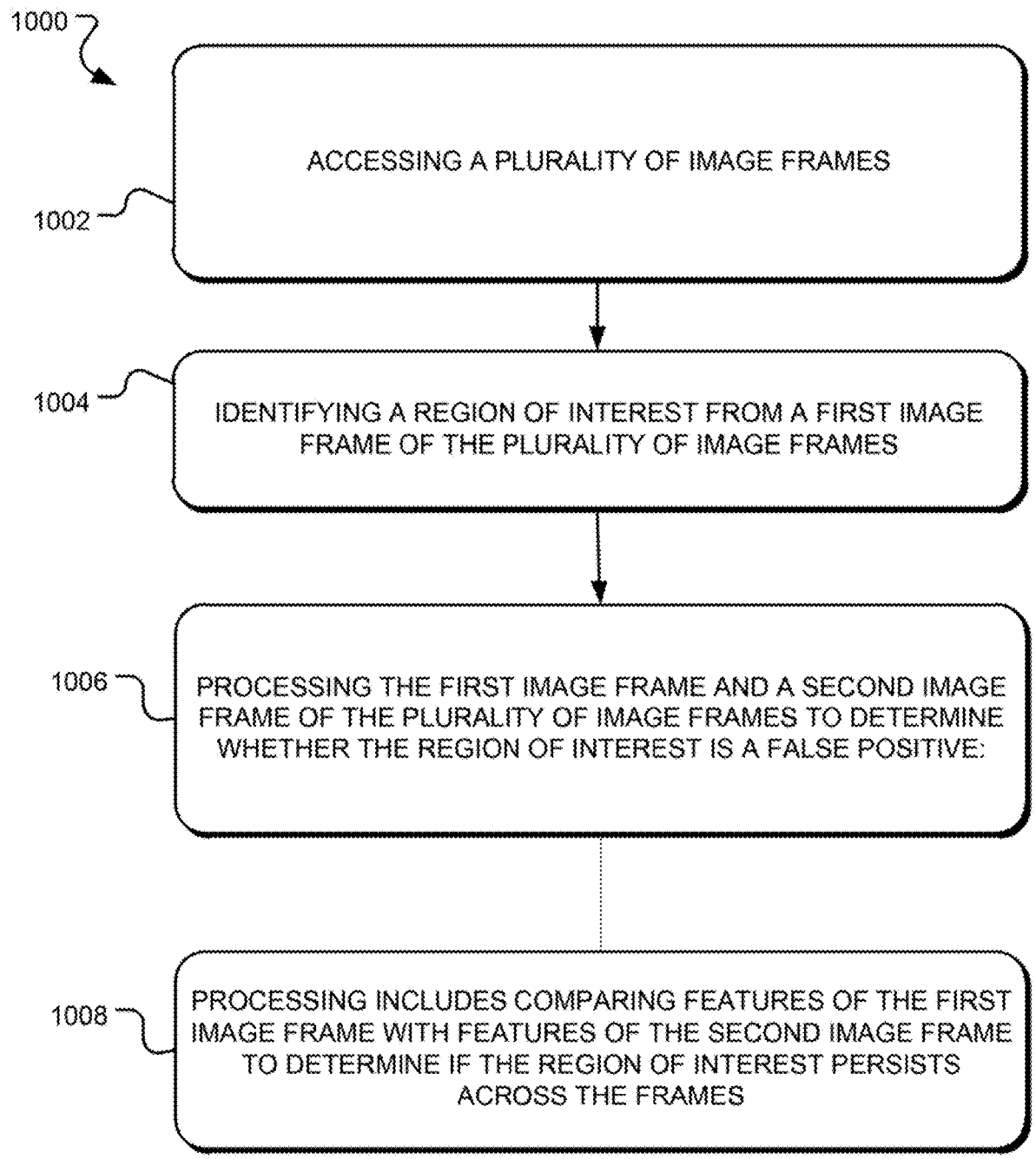
FIG. 10 is an exemplary process flow for aspects of the present inventive concept.
Figure 11:
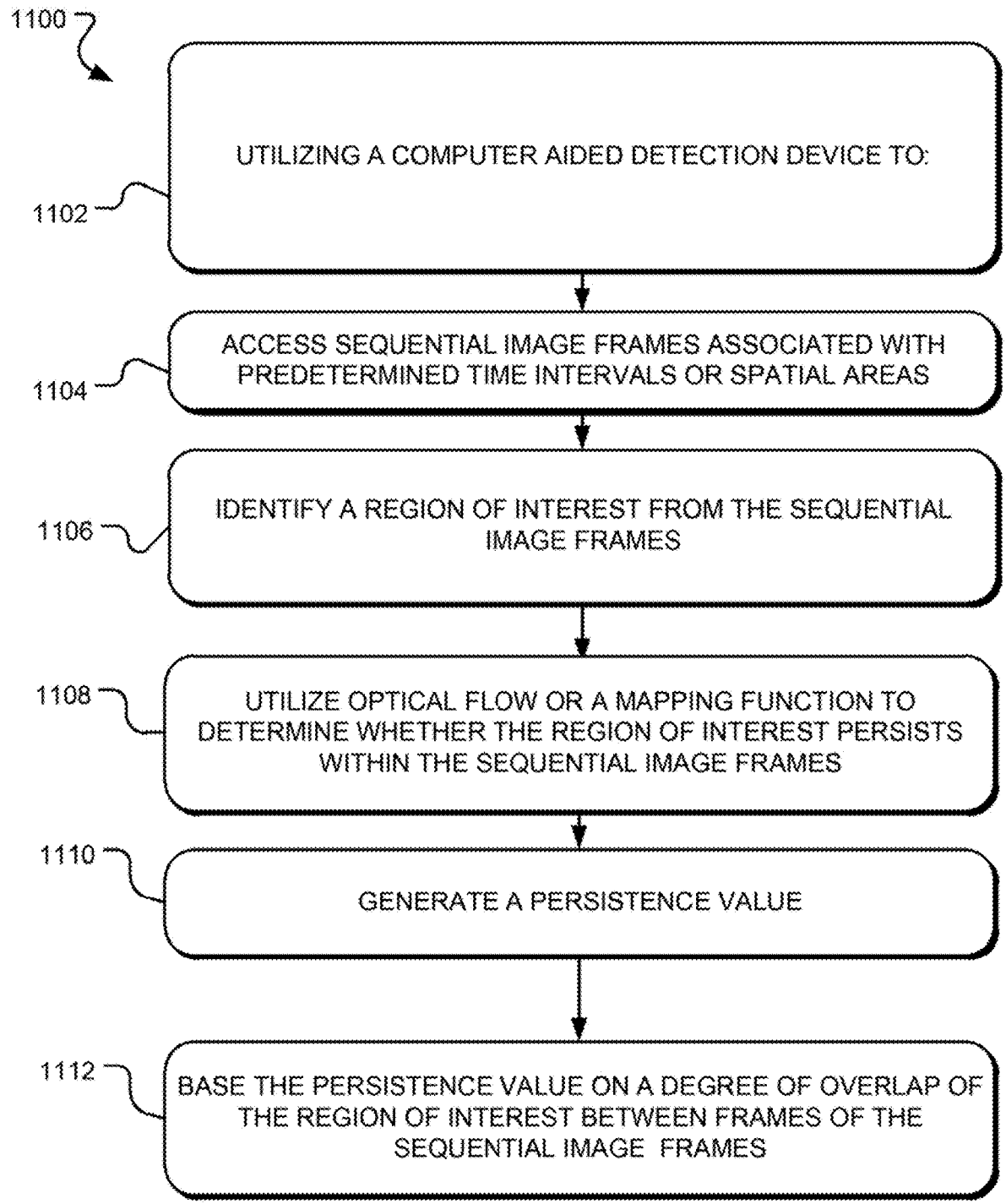
FIG. 11 is another exemplary process flow for aspects of the present inventive concept.

FIG. 11 is another exemplary process flow 1100 for implementing aspects of the present inventive concept, similar to the process flow 1000 of FIG. 10. As shown in block 1102, a CAD device may be implemented to perform certain functions. Specifically, in block 1104, the CAD device may access sequential image frames associated with predetermined time intervals or spatial areas of a patient. In block 1106, a region of interest may be identified within one or more of the sequential image frames. In block 1108, optical flow, or mapping functions may be implemented to process the sequential image frames and determine whether the region of interest persists between one or more of the image frames in the sequence. In block 1110, a persistence value may be generated. As shown in block 1112, the persistence value is based on a degree of overlap of the region of interest between frames of the sequential image frames.

A display device 108 may further be implemented with the computing device 106 to process images, or display the images 104 after processing. In some embodiments, the display device is directly coupled to the computing device 106 or the devices are part of the same device.

Additional aspects, advantages, and utilities of the present inventive concept will be set forth in part in the present description and drawings and, in part, will be obvious from the present description and drawings, or may be learned by practice of the present inventive concept. The present description and drawings are intended to be illustrative and are not meant in a limiting sense. Many features and sub-combinations of the present inventive concept may be made and will be readily evident upon a study of the present description and drawings. These features and sub-combinations may be employed without reference to other features and sub-combinations.

What is claimed is:
1. An apparatus, comprising:
a memory; and
a processor operatively coupled to the memory, the processor configured to:
identify a first region of interest (ROI) in a first image frame from a set of image frames, each image frame from the set of image frames depicting a tissue area, the first ROI being associated with an object;
identify a second ROI in a second image frame from the set of image frames, the second image frame being different from the first image frame, and the second ROI being associated with the object;

calculate at least a correlation between the first ROI identified in the first image frame and the second ROTS identified in the second image frame from the set of image frames;

determine a persistence value for the object associated with the first ROI and the second ROI, by counting a number of image frames from the set of image frames over which the object persists based on the at least a correlation between the first ROI, the second ROI, and additional ROIs identified in the remaining image frames; and determine a detection label for the object, by (1) determining that the object was an indication of a false positive identification of a lesion when the persistence value is below a threshold and (2) determining that the object was not an indication of a false positive identification of a lesion when the persistence value is above the threshold.

2. The apparatus of claim 1, further comprising:
an image generating device configured to capture a cineloop, the set of image frames being captured as a part of the cineloop.

3. The apparatus of claim 1, wherein:
the set of image frames is a sequence of image frames taken at predetermined time or spatial intervals, and
the processor is configured to track the object across the sequence of image frames using optical flow techniques.

4. The apparatus of claim 1, wherein:
the set of image frames is a sequence of image frames taken at predetermined time or spatial intervals, and
the processor is configured to track the object across the sequence of image frames by:
generating a mapping function that maps the object identified in the first image frame with the object identified in an adjacent image frame from the sequence of image frames; and
processing the sequence of image frames using the mapping function to track the object across the sequence of image frames.

5. The apparatus of claim 1, wherein the processor is configured to track the object across the set of image frames by tracking a position or a shape of the object across the set of image frames.

6. The apparatus of claim 1, wherein the processor is further configured to:
determine a compressibility of at least one of the first ROI or the second ROI with respect to surrounding tissue based on tracking the object from the first ROI in the first image frame to the second ROI in the second image frame,
the processor configured to determine the detection label for the object based further on the compressibility of at least one of the first ROI or the second ROI.

7. The apparatus of claim 1, wherein the processor is further configured to extract visual features from each image frame from the set of image frames,
the processor configured to track the object across the set of image frames using the visual features, the at least a correlation being calculated based on the tracking of the object.

8. The apparatus of claim 1, wherein the target is a lesion, and the processor is configured to
determine a confidence level associated with the detection label for the object based on the persistence value.

9. The apparatus of claim 1, wherein the processor is configured to identify the first ROI and the second ROI by using a computer-aided detection (CAD) system trained to identify one or more visual features indicative of a ROI containing an object comparable to a target lesion.

10. An apparatus, comprising:
a memory; and
a processor operatively coupled to the memory, the processor configured to:
receive a set of image frames depicting a tissue area and collected (1) over a temporal range and organized according to a temporal sequence or (2) from different viewpoints within a spatial range and organized according to a spatial sequence;
apply optical flow techniques to the set of image frames to obtain tracking information of a set of objects identified in sequential image frames from the set of image frames;
identify a first region of interest (ROI) in a first image frame from the set of image frames, the first ROI including an object from the set of objects;
identify a second ROI in a second image frame from the set of image frames, the second image frame being different from the first image frame, and the second ROI including the object;
correlate, using the tracking information, the first ROI with the second ROI;
determine a persistence value for the object included in the first ROI and the second ROI based on at least one correlation between the first ROI and the second ROI; and
determine whether the object represents a false positive identification of a target.

11. The apparatus of claim 10, further comprising:
an image generating device configured to capture a cineloop, the set of image frames being captured as a part of the cineloop.

12. The apparatus of claim 10, wherein:
the processor is further configured to extract visual features from each image frame from the set of image frames, and
the processor is configured to apply the optical flow techniques to the set of image frames by tracking the visual features across sequential image frames from the set of image frames.

13. The apparatus of claim 10, wherein the processor is configured to correlate the first ROI with the second ROI by:
identifying a set of ROIs each ROI from the set of ROIs being in each image frame from the set of image frames, the set of ROIs including the first ROI in the first image frame and the second ROI in the second image frame;
generating a set of predicted ROIs for the sequential image frames using the tracking information, each predicted ROI from the set of predicted ROIs being associated with each image frame from the set of image frames;
determining a degree of overlap between each predicted ROI, from the set of predicted ROIs, and associated with an image frame in the sequential image frames and each ROI, from the set of ROIs, and associated with that image frame in the sequential image frames; and
identifying correlations among the ROIs based on the degree of overlap.

14. The apparatus of claim 10, wherein the optical flow techniques include at least one of: a phase correlation, a block-based method, a differential method, or a discrete optimization method.

15. An apparatus, comprising:
a memory; and
a processor operatively coupled to the memory, the processor configured to:
   identify a first region of interest (ROI) in a first image frame and a second ROI in a second image frame, the first image frame and the second image frame being sequential image frames from a set of image frames collected (1) over a temporal range and organized according to a temporal sequence or (2) from different viewpoints within a spatial range and organized according to a spatial sequence;
   obtain tracking information of a set of objects between the first image frame and the second image frame;
   determine, based on the tracking information, a degree of overlap between the first ROI in the first image frame and the second ROI in the second image frame;
   determine, based on the degree of overlap, a persistence value for at least one object from the set of objects, the one object being included in the first ROI and the second ROI; and
   determine whether the object represents a false positive identification of a target based on the persistence value.

16. The apparatus of claim 15, further comprising:
an image generating device configured to capture a cineloop, the set of image frames being captured as a part of the cineloop.

17. The apparatus of claim 15, wherein the processor is configured to obtain the tracking information using optical flow techniques that track motion of the set of objects between the first image frame and the second image frame.

18. The apparatus of claim 15, wherein the target is a lesion, and the processor is further configured to determine that the object is a false positive identification of the lesion in response to determining that the persistence value is below a threshold value.

19. The apparatus of claim 15, wherein the processor is configured to identify the first ROI and the second ROI by using a computer-aided detection (CAD) system trained to identify one or more visual features indicative of the first ROI and the second ROI containing a lesion.

20. The apparatus of claim 15, wherein the tracking information is a tracking motion vector indicative of an estimation of motion of the set of objects between the first image frame and the second image frame.

21. An apparatus, comprising:
a memory; and
a processor operatively coupled to the memory, the processor configured to:
   identify a first region of interest (ROI) in a first image frame from a set of image frames, each image frame from the set of image frames depicting a tissue area, the first ROI being associated with an object;
   identify a second ROI in a second image frame from the set of image frames, the second image frame being different from the first image frame, and the second ROI being associated with the object;
   calculate at least a correlation between the first ROI identified in the first image frame and the second ROTS identified in the second image frame from the set of image frames;
   determine a persistence value for the object associated with the first ROI and the second ROI based on the at least a correlation between the first ROI and the second ROI;
   determine whether the object represents a false positive identification of a target based on the persistence value;
   determine a compressibility of at least one of the first ROI or the second ROI with respect to surrounding tissue based on tracking the object from the first ROI in the first image frame to the second ROI in the second image frame; and
   determine a label for the object based further on the compressibility of at least one of the first ROI or the second ROI, the label being associated with at least one of an indication of compressibility or an indication of whether the object represents a false positive identification of the target.

22. The apparatus of claim 21, wherein:
the set of image frames is a sequence of image frames taken at predetermined time or spatial intervals, and
the processor is configured to track the object across the sequence of image frames using optical flow techniques.

23. The apparatus of claim 21, further comprising:
an image generating device configured to capture a cineloop, the set of image frames being captured as a part of the cineloop.

24. The apparatus of claim 21, wherein the processor is configured to track the object across the set of image frames by tracking a position or a shape of the object across the set of image frames.

* * * * *